(12) United States Patent
Kobayashi et al.

(10) Patent No.: US 8,277,985 B2
(45) Date of Patent: Oct. 2, 2012

(54) SEPARATOR INCLUDING AN ELASTIC LAYER FOR USE IN HUMIDIFYING DEVICE, HUMIDIFYING DEVICE, AND FUEL CELL SYSTEM INCLUDING HUMIDIFYING DEVICE

(75) Inventors: Susumu Kobayashi, Nara (JP); Susumu Hatano, Shiga (JP)

(73) Assignee: Panasonic Corporation, Osaka (JP)

( * ) Notice: Subject to any disclaimer, the term of this patent is extended or adjusted under 35 U.S.C. 154(b) by 755 days.

(21) Appl. No.: 12/375,661

(22) PCT Filed: Dec. 12, 2007

(86) PCT No.: PCT/JP2007/073939
§ 371 (c)(1),
(2), (4) Date: Jan. 29, 2009

(87) PCT Pub. No.: WO2008/072657
PCT Pub. Date: Jun. 19, 2008

(65) Prior Publication Data
US 2009/0325034 A1   Dec. 31, 2009

(30) Foreign Application Priority Data
Dec. 14, 2006   (JP) .................... 2006-337014

(51) Int. Cl.
*H01M 8/04*   (2006.01)
(52) U.S. Cl. .................... 429/413; 261/104; 429/434
(58) Field of Classification Search .............. 429/413, 429/414; 261/104
See application file for complete search history.

(56) References Cited

U.S. PATENT DOCUMENTS

| | | | | |
|---|---|---|---|---|
| 6,921,598 B2 * | 7/2005 | Yamamoto et al. | ........... | 429/434 |
| 6,953,635 B2 * | 10/2005 | Suzuki et al. | ........... | 429/414 |
| 7,138,201 B2 * | 11/2006 | Inoue et al. | ........... | 429/492 |
| 7,141,323 B2 * | 11/2006 | Ballantine et al. | ........... | 429/411 |
| 7,611,786 B2 * | 11/2009 | Hatoh et al. | ........... | 429/434 |
| 7,662,503 B2 * | 2/2010 | Takase et al. | ........... | 429/514 |
| 7,754,371 B2 * | 7/2010 | Suzuki et al. | ........... | 429/49 |
| 8,039,154 B2 * | 10/2011 | Morita et al. | ........... | 429/428 |
| 8,071,243 B2 * | 12/2011 | Sugawara et al. | ........... | 429/429 |
| 2003/0162079 A1 | 8/2003 | Ooma et al. | | |
| 2005/0214626 A1 * | 9/2005 | Ohma | ........... | 429/38 |
| 2007/0178349 A1 | 8/2007 | Iino et al. | | |

FOREIGN PATENT DOCUMENTS

| | | |
|---|---|---|
| EP | 1 686 641 A1 | 8/2006 |
| JP | 55-137007 | 10/1980 |
| JP | 07-174373 | 7/1995 |

(Continued)

OTHER PUBLICATIONS

European Search Report issued in European Patent Application No. 07850490.9 dated Dec. 2, 2011.

*Primary Examiner* — Michael Zarroli
(74) *Attorney, Agent, or Firm* — McDermott Will & Emery LLP

(57) ABSTRACT

A separator for use in a humidifying device includes: main surfaces contacting steam permeable membranes (2), respectively; a fluid channel (3, 4) formed by concave portions (66, 81) of a convex-concave portion formed on each of the main surfaces; and an elastic layer (1*a*, 1*c*) formed up to at least a certain depth from tip ends of convex portions (67, 82) of the convex-concave portion.

13 Claims, 22 Drawing Sheets

FOREIGN PATENT DOCUMENTS

| | | |
|---|---|---|
| JP | 09-007621 | 1/1997 |
| JP | 10-172591 | 6/1998 |
| JP | 2000-348747 | 12/2000 |
| JP | 2001-023662 | 1/2001 |
| JP | 2002-216816 | 8/2002 |
| JP | 2005-032473 | 2/2005 |
| JP | 2006-210150 | 8/2006 |
| JP | 2006-286411 | 10/2006 |
| JP | 2006-336941 | 12/2006 |
| JP | 2007-163035 | 6/2007 |
| WO | WO 2006/107067 A1 | 10/2006 |

* cited by examiner

| | | UNIT | EXAMPLE 1 | COMPARATIVE EXAMPLE 2-1 | COMPARATIVE EXAMPLE 2-2 |
|---|---|---|---|---|---|
| SPECS OF HUMIDIFYING DEVICE | DEW POINT OF SUPPLIED OXIDIZING GAS | °C | 58 | 58 | 58 |
| | AMOUNT OF WATER CONTAINED IN SUPPLIED OXIDIZING GAS | g/min | 37.35 | 37.35 | 37.35 |
| | DEW POINT OF DISCHARGED OXIDIZING GAS | °C | 63 | 63 | 63 |
| | AMOUNT OF WATER CONTAINED IN DISCHARGED OXIDIZING GAS | g/min | 49.85 | 49.85 | 49.85 |
| | REQUIRED HUMIDIFICATION ABILITY | g/min | 12.50 | 12.50 | 12.50 |
| DESIGN CONDITIONS OF HUMIDIFYING DEVICE | WIDTH OF OXIDIZING GAS CHANNEL | mm | 50 | 50 | 50 |
| | LENGTH OF OXIDIZING GAS CHANNEL | mm | 100 | 100 | 100 |
| | DEPTH OF OXIDIZING GAS CHANNEL | mm | 1 | 1 | 1 |
| | NUMBER OF STACKED CELLS | | 6 | 6 | 8 |
| | FLOW RATE OF AIR OXIDIZING GAS | m/s | 11.79 | 11.79 | 8.84 |
| | HUMIDIFICATION AREA | m² | 0.03 | 0.03 | 0.04 |
| | STEAM PERMEABILITY COEFFICIENT | kg/s/m²/Pa | $6.39 \times 10^{-7}$ | $4.91 \times 10^{-7}$ | $4.60 \times 10^{-7}$ |
| | LOGARITHMIC MEAN STEAM DIFFERENTIAL PRESSURE | Pa | 11920.67 | 11920.67 | 11920.67 |
| | HUMIDIFICATION ABILITY | g/min | 13.71 | 10.55 | 13.17 |

Fig. 8

SEPARATOR INCLUDING AN ELASTIC LAYER FOR USE IN HUMIDIFYING DEVICE, HUMIDIFYING DEVICE, AND FUEL CELL SYSTEM INCLUDING HUMIDIFYING DEVICE

RELATED APPLICATIONS

This application is the U.S. National Phase under 35 U.S.C. §371 of International Application No. PCT/JP2007/073939, filed on Dec. 12, 2007, which in turn claims the benefit of Japanese Application No. 2006-337014, filed on Dec. 14, 2006, the disclosures of which Applications are incorporated by reference herein.

TECHNICAL FIELD

The present invention relates to a separator for use in a humidifying device, the humidifying device, and a fuel cell system including the humidifying device, and particularly to a configuration of the separator.

BACKGROUND ART

A polymer electrolyte fuel cell is a device which causes a hydrogen-rich fuel gas and an oxidizing gas, such as air, containing oxygen to electrochemically react with each other to generate electric power and heat. To maintain ionic conductivity of polymer electrolytes (hydrogen ions) of a polymer electrolyte membrane used in the fuel cell, it is necessary to humidify and supply at least one of the fuel gas and the oxidizing gas (each of which is referred to as "reactant gas"). In a typical fuel cell system, a total enthalpy heat exchange type humidifying device humidifies the reactant gas by using as a heat source and a water source a highly-humidified off gas and discharged cooling water discharged from a stack.

Known as such humidifying device is a humidifying device configured by: stacking a steam permeable membrane and a separator which has on one of main surfaces a channel groove through which the reactant gas flows and on the other main surface a channel groove through which the discharged cooling water or the off gas flows; and fastening this stack body (see Patent Documents 1 and 2 for example).

The humidifying device disclosed in Patent Document 1 and 2 has the problem that at a portion of the separator which portion supports the steam permeable membrane, especially at a portion of the separator which portion is located between the channel grooves through which the reactant gas flows, the steam permeable membrane bends toward one of the separators by the difference of pressure between the reactant gas and the off gas, the expansion of the discharged cooling water caused due to freezing thereof, and the like, thereby being damaged. To be specific, in the case of the humidifying device which uses the reactant gas (secondary fluid) that is a humidified gas and the off gas (primary fluid) that is a humidifying gas, when the difference of pressure between the reactant gas and the off gas is large, the steam permeable membrane may bend toward a side where the pressure is low. Moreover, in the case of the humidifying device which uses the reactant gas (secondary fluid) as the humidified gas and the discharged cooling water (primary fluid) that is the humidifying fluid, the steam permeable membrane may bend toward the reactant gas side by the expansion of the discharged cooling water caused due to freezing thereof. Therefore, the problem is that a stress applied to the steam permeable membrane by a portion (convex portion) of the separator which portion supports the steam permeable membrane becomes different from a stress applied to the steam permeable membrane by a portion of the separator which portion is the channel groove (concave portion) through which the reactant gas or the discharged cooling water flows, and if these different stresses continue to be applied locally, the steam permeable membrane is damaged.

Since the steam permeable membrane is low in mechanical strength and easily damaged, proposed is a humidifier using a steam permeable membrane having high mechanical strength (see Patent Document 3 for example).

Moreover, to prevent the steam permeable membrane, which is low in mechanical strength, from being damaged, proposed is to provide a membrane guide member which has a mesh configuration or a large number of through holes and suppresses bending of the steam permeable membrane (see Patent Document 4 for example).

Patent Document 1: Japanese Laid-Open Patent Application Publication 9-7621
Patent Document 2: Japanese Laid-Open Patent Application Publication 2001-23662
Patent Document 3: Japanese Laid-Open Patent Application Publication 2000-348747
Patent Document 4: Japanese Laid-Open Patent Application Publication 2006-210150

DISCLOSURE OF THE INVENTION

Problems to be Solved by the Invention

A humidification performance of the humidifying device is generally represented by Formula (1). As represented by Formula (1), the amount of steam which moves from water to a gas per unit time is proportional to a steam permeability coefficient of a steam permeable membrane to be used, the area of the steam permeable membrane, and a steam differential pressure between both sides of the steam permeable membrane. In the case of a heat exchange type humidifying device, a logarithmic mean steam differential pressure represented by Formula (2) is used as an arithmetic average of the steam differential pressure of a humidifying region.

$$\text{Humidification Ability(kg/sec)} = \text{Steam Permeability Coefficient(kg/sec/m}^2\text{/Pa)} \times \text{Area of Membrane (m}^2\text{)} \times \text{Steam Differential Pressure(Pa)} \quad (1)$$

$$\text{Logarithmic Mean Steam Differential Pressure} = \{(\text{Psat1}-\text{Psat3})-(\text{Psat2}-\text{Psat4})\}/\text{LN}\{(\text{Psat1}-\text{Psat3})/(\text{Psat2}-\text{Psat4})\} \quad (2)$$

Psat1: Saturated Steam Pressure Calculated from Temperature of Input Humidifying Fluid (Hot Water)
Psat2: Saturated Steam Pressure Calculated from Temperature of Output Humidifying Fluid (Hot Water)
Psat3: Saturated Steam Pressure Calculated from Dew Point of Input Humidified Fluid (Dry Gas)
Psat4: Saturated Steam Pressure Calculated from Dew Point of Output Humidified Fluid (Humidifying Gas)

Therefore, in the humidifier disclosed in Patent Document 4, the membrane supporting member becomes resistance to water permeation. For example, an effective area of the membrane decreases in accordance with an opening ratio of holes (openings) formed on a metallic plate that is the membrane supporting member. Therefore, the humidification ability per unit area deteriorates. On this account, to compensate this deterioration, the area of the membrane needs to be increased, to be specific, the number of membranes stacked needs to be increased. However, this increases the manufacturing cost. Thus, there is still room for improvement.

The present invention was made in view of the above problems, and an object of the present invention is to provide a separator for use in a humidifying device which is simply configured and can adequately suppress the damage of a steam permeable membrane, the humidifying device which can drive safe and excels in a humidification ability by having such separator, and a fuel cell system including such humidifying device.

Means for Solving the Problems

To solve the above conventional problems, a separator for use in a humidifying device according to the present invention includes: main surfaces contacting steam permeable membranes, respectively; a fluid channel formed by concave portions of a convex-concave portion formed on each of the main surfaces; and an elastic layer formed up to at least a specified depth from tip ends of convex portions of the convex-concave portion.

With this, it is possible to cushion and absorb an external force applied to the steam permeable membrane, and therefore adequately suppress the damage of the steam permeable membrane.

In the separator according to the present invention, a thickness of the elastic layer may be not less than 1.66 times as large as a thickness of the steam permeable membrane.

The separator according to the present invention may include the elastic layer and a stiff layer.

With this, even if the separator is thin, it can have enough strength.

In the separator according to the present invention, wall portions formed by the elastic layer may be formed to project from a surface of the stiff layer, the wall portions may constitute the convex portions of the convex-concave portion, and spaces between the wall portions may constitute a channel as the concave portions of the convex-concave portion.

In the separator according to the present invention, the convex portions may be entirely constituted by the elastic layer.

The separator according to the present invention may further include: a first elastic layer disposed on one of the main surfaces; and a second elastic layer disposed on the other main surface, wherein: the first elastic layer and the second elastic layer may be connected to each other by through holes formed on the stiff layer.

The separator according to the present invention may be entirely formed by the elastic layer.

In the separator according to the present invention, it is preferable that the elastic layer be formed to contain EPDM or fluorocarbon rubber not containing sulfur.

In the separator according to the present invention, it is preferable that the elastic layer have hardness of 30 to 100 of A Scale of Durometer Hardness defined in JIS K6200.

With this, the separator also functions as a sealing member for fluid seal. Thus, it is possible to further simplify the configuration of the humidifying device.

A humidifying device according to the present invention includes: the separators; and the steam permeable membranes, wherein: the separators and the steam permeable membranes are stacked on and fastened to one another such that the steam permeable membrane is sandwiched between the main surfaces of the separators on which surface the elastic layer is formed; and a primary fluid flows through a first channel formed on one of the main surfaces of each of the separators which surface contacts the steam permeable membrane, and a secondary fluid flows through a second channel formed on the other main surface of each of the separators which surface contacts the steam permeable membrane, causing moisture contained in the primary fluid to permeate the steam permeable membrane to humidify the secondary fluid.

With this, the humidifying device according to the present invention can adequately suppress the damage of the steam permeable membrane with a simple configuration. In addition, the humidifying device according to the present invention excels in the humidification ability and can operate safe.

A fuel cell system according to the present invention includes: a fuel cell configured to generate electric power by using a fuel gas and an oxidizing gas; and the humidifying device which is disposed on a supply channel of at least one of the fuel gas and the oxidizing gas.

With this, it is possible to suppress the physical damage caused due to the differential pressure, the freezing, and the like of the steam permeable membrane in the humidifying device. Therefore, the reliability of the fuel cell system improves.

Effects of the Invention

In accordance with the separator for use in the humidifying device, the humidifying device, and the fuel cell system including the humidifying device according to the present invention, it is possible to suppress the physical damage caused by the differential pressure, the freezing, and the like to the steam permeable membrane with a quite simple configuration, and it is also possible to configure the humidifying device which is higher in performance than the conventional ones. Further, by mounting the humidifying device of the present invention on the fuel cell system, the reliability of the fuel cell system can be improved in light of the problems, such as the differential pressure and the freezing.

BRIEF DESCRIPTION OF THE DRAWINGS

FIG. 8 is a table showing design conditions of the humidifying device of Example 1 and design conditions of the humidifying device of Comparative Example 2.

Figure 1:
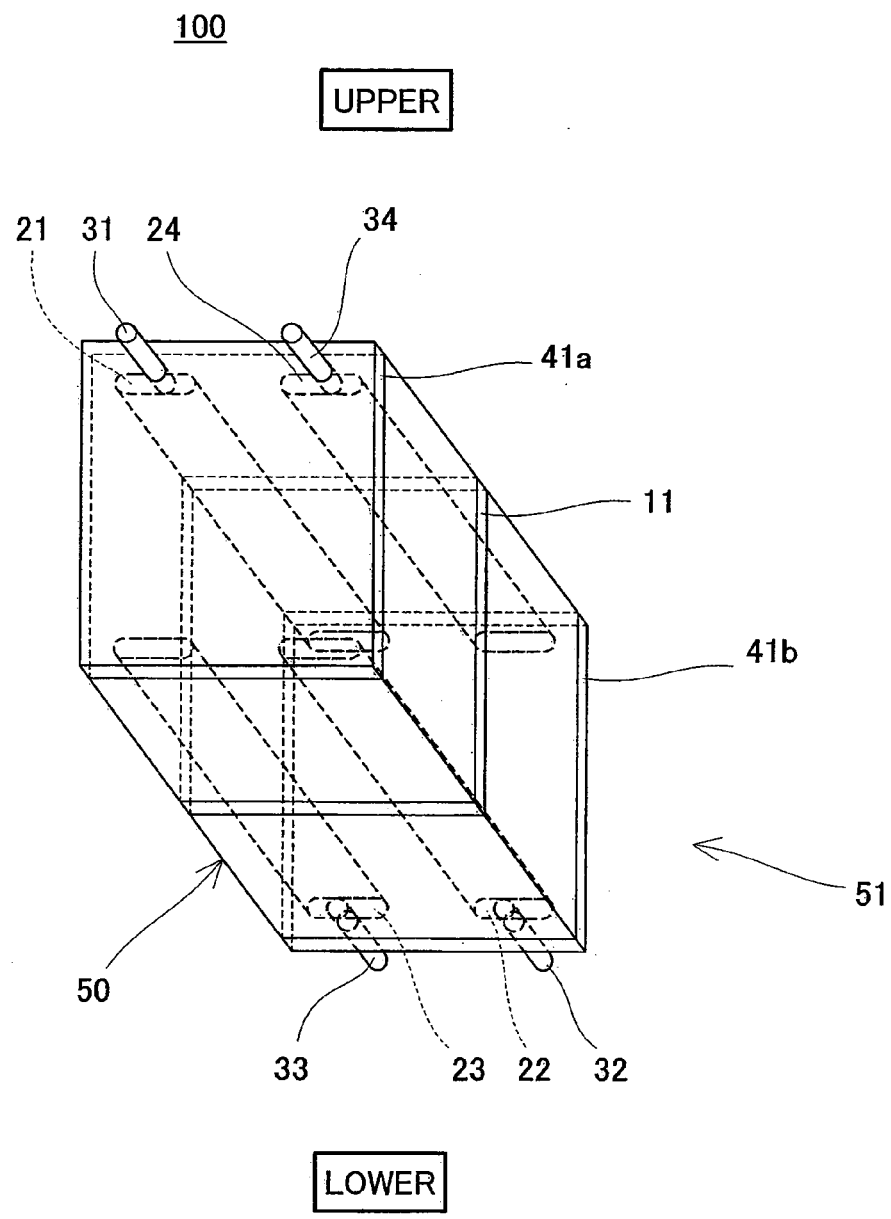
FIG. 1 is a schematic diagram showing the configuration of a humidifying device according to Embodiment 1 of the present invention.

EXPLANATION OF REFERENCE NUMBERS 1 separator
1a elastic layer
1b stiff layer
1c elastic layer
1d elastic body
2 steam permeable membrane
3 first channel (cooling water channel)
4 second channel (oxidizing gas channel)
5 gasket (fluid seal)
6 groove
7 projecting portion
11 humidifying cell
21 secondary fluid supply manifold
22 secondary fluid discharge manifold
23 primary fluid supply manifold
24 primary fluid discharge manifold
31 secondary fluid supply pipe
32 secondary fluid discharge pipe
33 primary fluid supply pipe
34 primary fluid discharge pipe
41a first end plate
41b second end plate
50 humidifying cell stack body
51 humidifying cell stack
61 secondary fluid supply manifold hole
62 secondary fluid discharge manifold hole
63 primary fluid supply manifold hole
64 primary fluid discharge manifold hole
65 through hole
66 first concave portion
67 first convex portion
68 corner portion
69 concave portion
70 convex portion
71 secondary fluid supply manifold hole
73 primary fluid supply manifold hole
81 second concave portion
82 second convex portion
100 humidifying device
100a humidifying device
100b humidifying device
101 polymer electrolyte fuel cell (PEFC)
102 oxidizing gas supplying device
103 total enthalpy heat exchanger
104 cooling water supplying device

BEST MODE FOR CARRYING OUT THE INVENTION

Hereinafter, preferred embodiments of the present invention will be explained in reference to the drawings. In the drawings, same reference numbers are used for the same or corresponding portions, and a repetition of the same explanation is avoided.

Embodiment 1

First, a humidifying device according to Embodiment 1 of the present invention will be explained.

Humidifying Device

FIG. 1 is a schematic diagram showing the configuration of the humidifying device according to Embodiment 1 of the present invention. In FIG. 1, a vertical direction of the humidifying device is defined as a vertical direction in the drawing.

As shown in FIG. 1, a humidifying device 100 according to Embodiment 1 includes a humidifying cell stack 51. The humidifying cell stack 51 includes: a humidifying cell stack body 50 formed by stacking plate-shaped humidifying cells 11 in a thickness direction of the humidifying cell 11; first and second end plates 41a and 41b disposed on both ends, respectively, of the humidifying cell stack body 50; fasteners, not shown, which fasten the humidifying cell stack body 50 and the first and second end plates 41a and 41b in a stack direction of the humidifying cells 11. Note that the plate-shaped humidifying cell 11 extends in parallel with a vertical plane, and the stack direction of the humidifying cells 11 is a horizontal direction.

A secondary fluid supply manifold 21 is formed at an upper portion of one side portion (hereinafter referred to as "first side portion") of the humidifying cell stack body 50 so as to penetrate through the humidifying cell stack body 50 in the stack direction of the humidifying cell stack body 50. One end of the secondary fluid supply manifold 21 is communicated with a through hole formed on the first end plate 41a, and the through hole is connected to a secondary fluid supply pipe 31. The other end of the secondary fluid supply manifold 21 is closed by the second end plate 41b.

A secondary fluid discharge manifold 22 is formed at a lower portion of the other side portion (hereinafter referred to as "second side portion") of the humidifying cell stack body 50 so as to penetrate through the humidifying cell stack body 50 in the stack direction of the humidifying cell stack body 50. One end of the secondary fluid discharge manifold 22 is communicated with a through hole formed on the second end plate 41b, and the through hole is connected to a secondary fluid discharge pipe 34. The other end of the secondary fluid discharge manifold 22 is closed by the first end plate 41a.

A primary fluid supply manifold 23 is formed at a lower portion of the first side portion of the humidifying cell stack body 50 so as to penetrate through the humidifying cell stack body 50 in the stack direction of the humidifying cell stack body 50. One end of the primary fluid supply manifold 23 is communicated with a through hole formed on the second end plate 41b, and the through hole is connected to a primary fluid supply pipe 33. The other end of the primary fluid supply manifold 23 is closed by the first end plate 41a.

A primary fluid discharge manifold 24 is formed at an upper portion of the second side portion of the humidifying cell stack body 50 so as to penetrate through the humidifying cell stack body 50 in the stack direction of the humidifying cell stack body 50. One end of the primary fluid discharge manifold 24 is communicated with a through hole formed on the first end plate 41a, and the through hole is connected to a primary fluid discharge pipe 34. The other end of the primary fluid discharge manifold 24 is closed by the second end plate 41b.

Next, the humidifying cell 11 of the humidifying device 100 according to Embodiment 1 will be explained.

Figure 2:
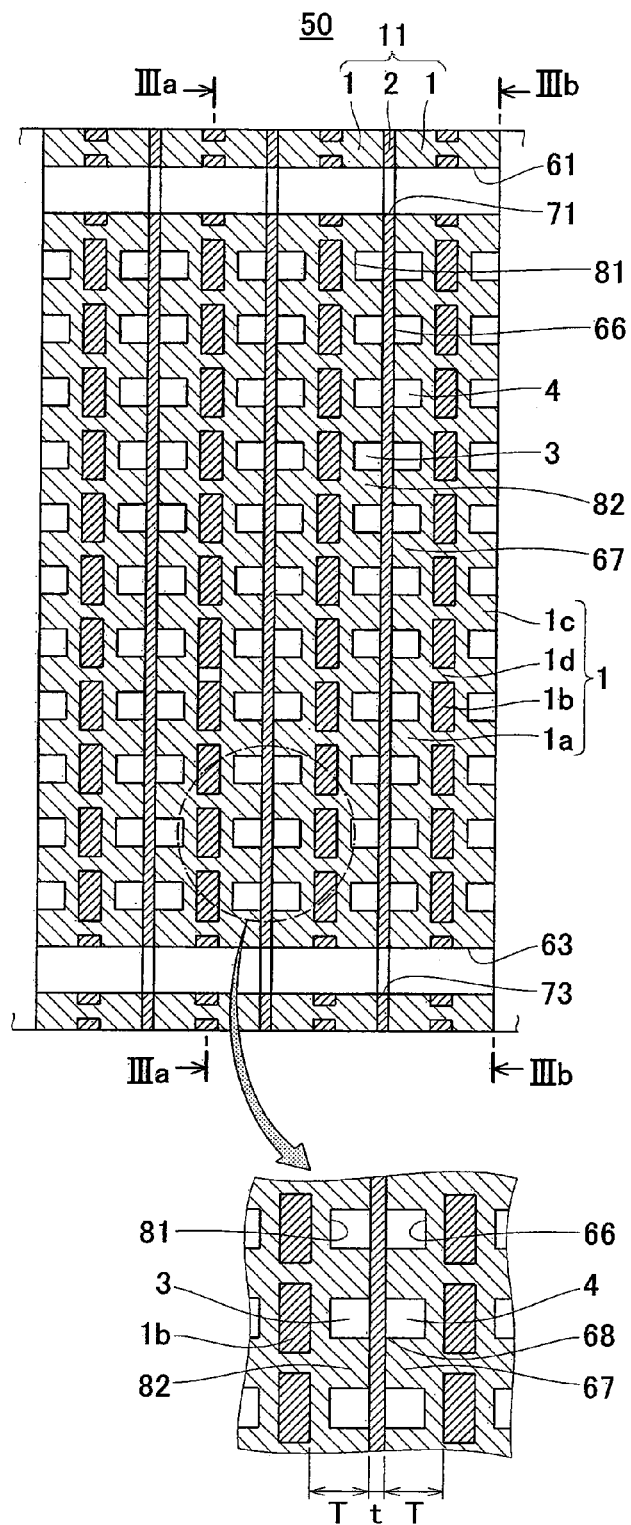
FIG. 2 is a cross-sectional view schematically showing the configuration of a humidifying cell of the humidifying device shown in FIG. 1.

FIG. 2 is a cross-sectional view schematically showing the configuration of the humidifying cell stack body 50 of the humidifying device 100 shown in FIG. 1. In FIG. 2, a part of the humidifying cell stack body 50 is omitted.

As shown in FIG. 2, the humidifying cell 11 includes a pair of plate-shaped separators 1 and a flake steam permeable membrane 2. Manifold holes, such as a secondary fluid supply manifold hole 71 and a primary fluid supply manifold hole 73 which penetrate through the steam permeable membrane 2 in a thickness direction thereof, are formed at a peripheral portion of the steam permeable membrane 2. The steam permeable membrane 2 can be formed by a membrane (for example, Hipore 7025 (Product Name) produced by Asahi Kasei Chemicals Corporation) provided with a large number of minute holes which allow steam to permeate there and penetrate through the membrane in the thickness direction of the membrane or a membrane (for example, perfluoro sulfonic acid resin (Nafion (Product Name) produced by Du Pond)) having a high steam permeability. The steam permeable membrane 2 is not especially limited as long as the steam can permeate the steam permeable membrane 2.

A pair of the separators 1 are disposed to sandwich the steam permeable membrane 2. Each of the separators 1 includes a pair of a first elastic layer 1a and a second elastic layer 1c, and a plate-shaped stiff layer 1b. The first elastic layer 1a and the second elastic layer 1c are formed on both main surfaces, respectively, of the stiff layer 1b. A second channel 4 through which a secondary fluid flows is formed on one main surface (outer surface of the first elastic layer 1a) of the separator 1, and a first channel 3 through which a primary fluid flows is formed on another main surface (outer surface of the second elastic layer 1c) of the separator 1. Moreover, manifold holes, such as a secondary fluid supply manifold hole 61 and a primary fluid supply manifold hole 63 which penetrate through the separator 1 in a thickness direction thereof, are formed at a peripheral portion of the separator 1.

The humidifying cell stack body 50 is formed by stacking such humidifying cells 11 in the thickness direction. The manifold holes, such as the secondary fluid supply manifold holes 61, which are formed on the separators 1 and the steam permeable membranes 2 are connected to one another in the thickness direction in a state where the humidifying cells 11 are stacked. Thus, manifolds, such as the secondary fluid supply manifold 21, are formed. Then, by causing the primary fluid to flow through the first channel 3 of the humidifying cell 11 and the secondary fluid to flow through the second channel 4 of the humidifying cell 11, moisture contained in the primary fluid permeates the steam permeable membrane 2 to humidify the secondary fluid.

Next, the configuration of the separator 1 will be explained in detail in reference to FIG. 3.

Figure 3A:
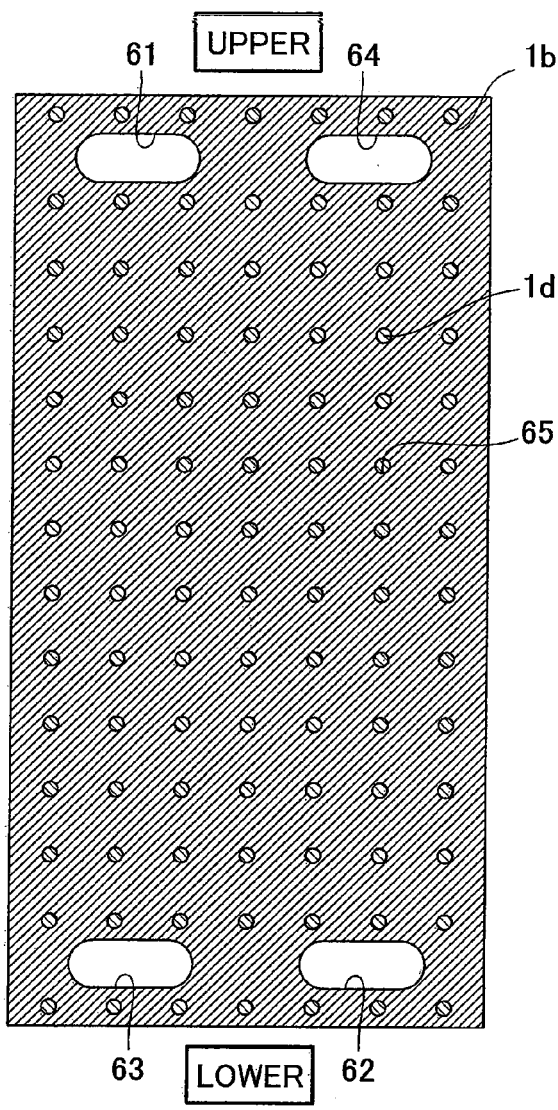
FIG. 3(a) is a cross-sectional view which schematically shows the configuration of a stiff layer constituting a separator of FIG. 2 and is taken along line IIIa-IIIa of FIG. 2.
Figure 3B:
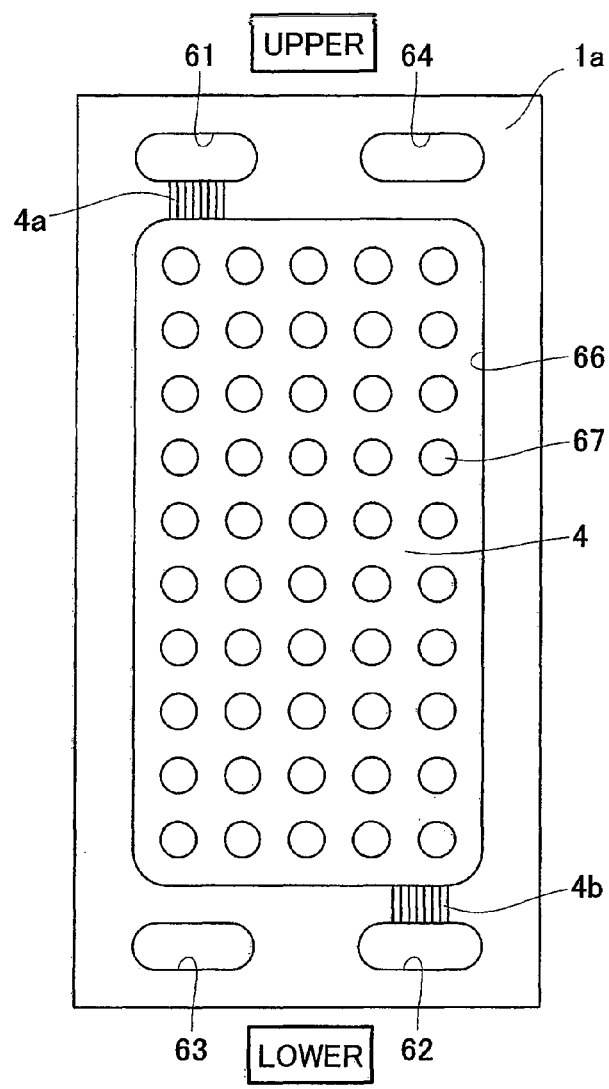
FIG. 3(b) is a front view of the separator of FIG. 2.
Figure 3C:
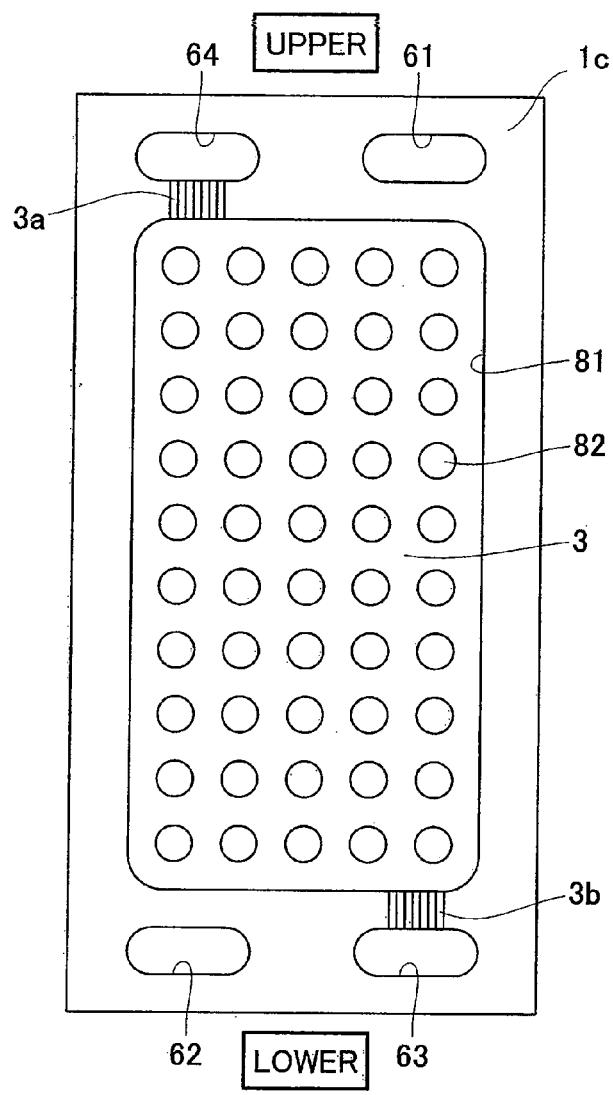
FIG. 3(c) is a rear view of the separator of FIG. 2.

FIG. 3(a) schematically shows the configuration of the stiff layer 1b constituting the separator 1 of FIG. 2, and is a cross-sectional view taken along line IIIa-IIIa of FIG. 2. FIG. 3(b) is a front view of the separator 1 of FIG. 2. FIG. 3(c) is a rear view of the separator 1 of FIG. 2. In FIGS. 3(a) to 3(c), a vertical direction of the stiff layer 1b, the first elastic layer 1a, or the second elastic layer 1c of the separator 1 is defined as a vertical direction in the drawing.

As shown in FIG. 3(a), the secondary fluid supply manifold hole 61, a secondary fluid discharge manifold hole 62, the primary fluid supply manifold hole 63, and a primary fluid discharge manifold hole 64 which penetrate through the stiff layer 1b in the thickness direction, are formed at a peripheral portion of the stiff layer 1b. In addition, through holes 65 which penetrate through the stiff layer 1b in the thickness direction are formed on a portion of the stiff layer 1b other than portions where the above manifold holes are formed. The through holes 65 are filled with an elastic body 1d which is the same as the elastic body constituting the first elastic layer 1a and the second elastic layer 1c such, that the first elastic layer 1a and the second elastic layer 1c are connected to each other (see FIG. 2). With this, the adhesion between one main surface of the stiff layer 1b and an inner surface of the first elastic layer 1a and the adhesion between the other main surface thereof and an inner surface of the second elastic layer 1c are secured.

As shown in FIG. 3(b), the secondary fluid supply manifold hole 61, the secondary fluid discharge manifold hole 62, the primary fluid supply manifold hole 63, and the primary fluid discharge manifold hole 64 which penetrate through the first elastic layer 1a in the thickness direction are formed at a peripheral portion of the first elastic layer 1a. In addition, a first concave portion 66 is formed on the outer surface of the first elastic layer 1a. Herein, the first concave portion 66 has a substantially square shape in the front view (when viewed in the thickness direction), and corner portions of the first concave portion 66 are rounded. In the first concave portion 66, a large number of first convex portions 67 are formed to project from a bottom surface of the first concave portion 66 in the thickness direction. Then, the first concave portion 66 and the first convex portions 67 constitute a first convex-concave portion, and a portion of the first concave portion 66 at which portion the first convex portions 67 are not formed forms the second channel 4. Further, an upper end portion 4a of the second channel 4 extends upward from an upper end of the first concave portion 66, and a lower end portion 4b of the second channel 4 extends downward from a lower end of the first concave portion 66.

Moreover, as shown in FIG. 3(c), as with the first elastic layer 1a, the secondary fluid supply manifold hole 61, the secondary fluid discharge manifold hole 62, the primary fluid supply manifold hole 63, and the primary fluid discharge manifold hole 64 which penetrate through the second elastic layer 1c in the thickness direction are formed at a peripheral portion of the second elastic layer 1c. In addition, a second concave portion 81 is formed on the outer surface of the second elastic layer 1c. Herein, the second concave portion 81 has a substantially square shape in the rear view (when viewed in the thickness direction), and corner portions of the second concave portion 81 are rounded. In the second concave portion 81, a large number of second convex portions 82 are formed to project from a bottom surface of the second concave portion 81 in the thickness direction. Then, the second concave portion 81 and the second convex portions 82 constitute a second convex-concave portion, and a portion of the second concave portion 81 at which portion the second convex portions 82 are not formed forms the first channel 3. Further, an upper end portion 3a of the first channel 3 extends upward from an upper end of the second concave portion 81, and a lower end portion 3b of the first channel 3 extends downward from a lower end of the second concave portion 81.

Herein, the second channel 4 is formed by the portion of the first concave portion 66 at which portion the first convex portions 67 are not formed. However, the present embodiment is not limited to this. The second channel 4 may be formed by, for example, a plurality of grooves as long as the secondary fluid flows through substantially the entire main surface of the first elastic layer 1a, and the second channel 4 is formed to be depressed from the main surface of the first elastic layer 1a. Similarly, the first channel 3 may be formed by, for example, a plurality of grooves as long as the primary fluid flows through substantially the entire main surface of the second elastic layer 1c, and the first channel 3 is formed to be depressed from the main surface of the second elastic layer 1c.

Next, a relation between the thickness of the steam permeable membrane 2 and the thickness of the first elastic layer 1a or the second elastic layer 1c of the separator 1 in the humidifying device 100 according to Embodiment 1 configured as above will be explained.

Figure 9:
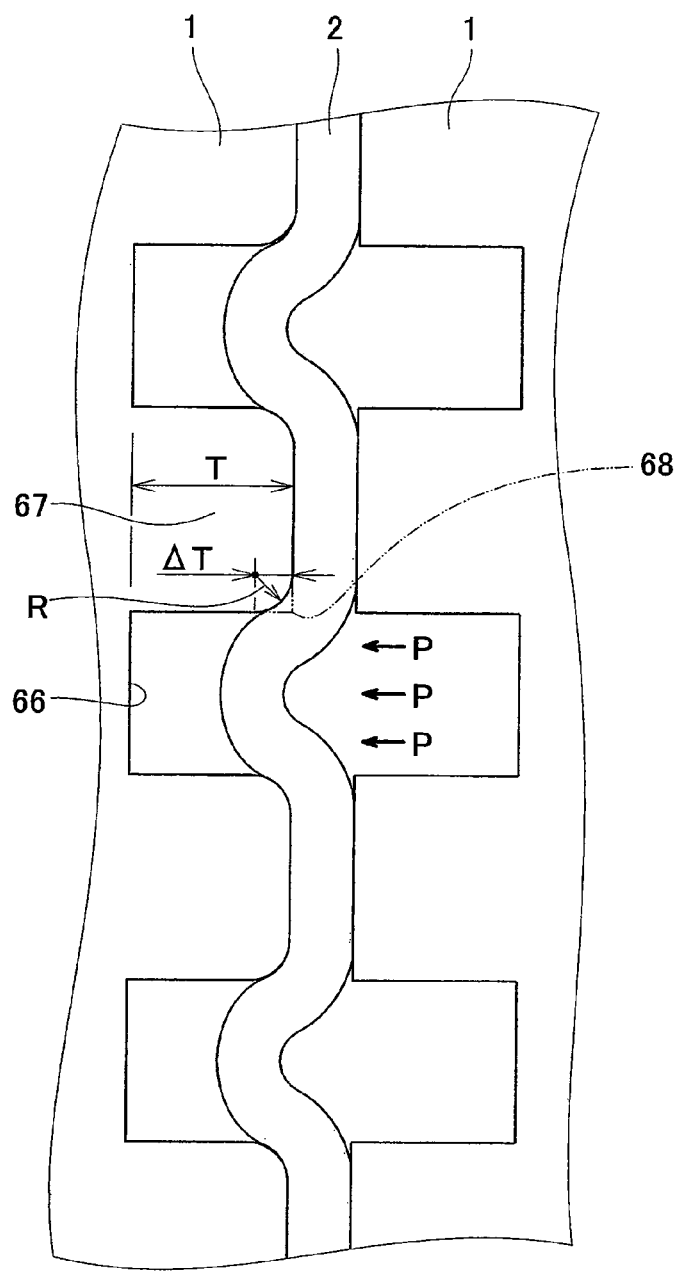
FIG. 9 is a cross-sectional view schematically showing a state of the humidifying cell when a stress applied to the steam permeable membrane by a convex portion supporting the steam permeable membrane is different from a stress applied to the steam permeable membrane by a concave portion.

First, the reason why the steam permeable membrane 2 is damaged will be explained in reference to FIGS. 2 and 9. FIG. 9 is a cross-sectional view schematically showing a state of the humidifying cell 11 when a stress applied to the steam permeable membrane 2 by the first convex portion 67 supporting the steam permeable membrane 2 is different from a stress applied to the steam permeable membrane 2 by the first concave portion 66. In FIG. 9, a part of the humidifying cell 11 is omitted, and hatching is omitted.

As shown in FIGS. 2 and 9, a thickness T (depth from a surface of the first elastic layer 1a which surface contacts the steam permeable membrane 2 (depth from the outer surface of the first elastic layer 1a)) of the first elastic layer 1a denotes a distance from the outer surface of the first elastic layer 1a to the inner surface of the first elastic layer 1a.

Moreover, as shown in FIG. 9, in a case where the pressure of the primary fluid and the pressure of the secondary fluid are significantly different from each other (herein, the pressure of the secondary fluid is higher than that of the primary fluid), a pressure P is locally applied to a corner portion 68 of the first convex portion 67 (the stress concentrates on the corner portion 68 of the first convex portion 67). In this case, in the separator 1 according to Embodiment 1, since the first convex portion 67 is formed by the elastic body (first elastic layer 1a), the corner portion 68 of the first convex portion 67 elastically deforms. At this time, an elastic deformation volume (compressed thickness of the first elastic layer 1a) $\Delta T$ of the corner portion 68 is equal to a curvature radius R of the corner portion 68 ($\Delta T = R \ldots (5)$).

Then, as shown in FIG. 9, the steam permeable membrane 2 is damaged when a thickness t of the steam permeable membrane 2 is small or the curvature radius R is small. Therefore, even if the corner portion 68 of the first convex portion 67 of the first elastic layer 1a of the separator 1 elastically deforms, the steam permeable membrane 2 is not damaged as long as the corner portion 68 has a predetermined curvature radius R.

Next, a relation between the thickness of the steam permeable membrane 2 and the thickness of the first elastic layer 1a or the second elastic layer 1c of the separator 1 will be explained. Herein, since the first elastic layer 1a and the second elastic layer 1c have the same configuration as each other, the relation between the thickness of the first elastic layer 1a and the thickness of the steam permeable membrane 2 will be explained, and an explanation of the second elastic layer 1c is omitted.

Figure 10:
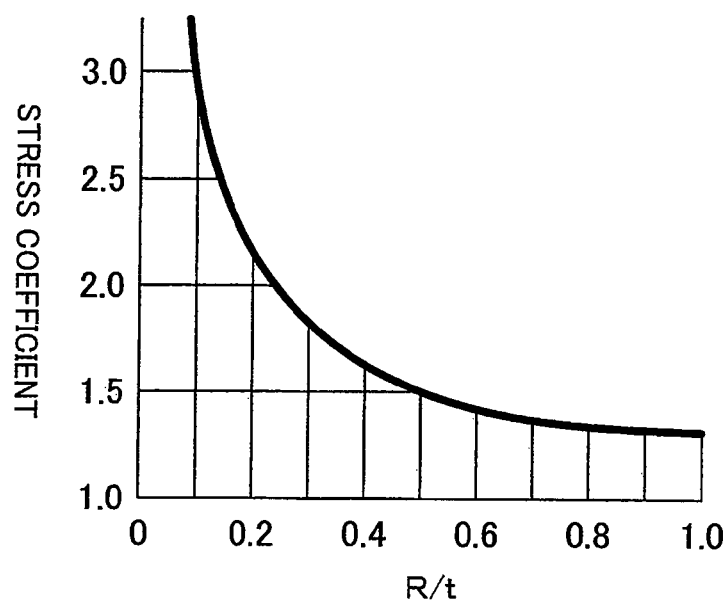
FIG. 10 is a graph showing a relation among a curvature radius R shown in FIG. 9, a thickness t of the steam permeable membrane, and a degree of stress concentration (to be specific, stress concentration coefficient).

FIG. 10 is a graph showing a relation among the curvature radius R shown in FIG. 9, the thickness t of the steam permeable membrane 2, and the degree of the stress concentration (to be specific, stress concentration coefficient). As shown in FIG. 10, the stress concentration coefficient changes little when it is not more than 1.5. On this account, the thickness of the steam permeable membrane 2 and the curvature radius R of the corner portion 68 of the first convex portion 67 of the separator 1 are adjusted such that the stress concentration coefficient becomes 1.5 or less, in other words, the curvature radius R divided by the thickness t becomes 0.5 or more ($R/t \geq 0.5 \ldots (6)$). With this, the concentration of the stress applied to the steam permeable membrane 2 can be relaxed. Thus, the damage of the steam permeable membrane 2 can be suppressed.

A general limit of a compression rate of the elastic body constituting the first elastic layer 1a is 30% (that is, the limit of the compression rate at which elastic fracture does not occur is 30%). When the compressed thickness of the first elastic layer 1a is $\Delta T$, Formula (7) that is $\Delta T/T \leq 0.3$ is established. Here, using Formula (7), the thickness T of the first convex portion 67 (the first elastic layer 1a) which is maximally compressed is represented by Formula (8) that is $T = 0.3 \times \Delta T$. Then, as described above, to avoid the damage of the steam permeable membrane 2 in a case where the first convex portion 67 (first elastic layer 1a) is maximally compressed, the corner portion 68 of the first convex portion 67 needs to have a predetermined curvature radius R.

Therefore, by substituting Formulas (5) and (8) into Formula (6) and solving these formulas, Formula (9) that is $T \geq 1.66 \times t$ is obtained. Therefore, it is preferable that the thickness T of the first elastic layer 1a be not less than 1.66 times as large as the thickness t of the steam permeable membrane 2.

As described above, it is preferable that the thickness T of the first elastic layer 1a be not less than 1.66 times as large as the thickness t of the steam permeable membrane 2. However, $t \times 1.66$ of the thickness T of the first elastic layer 1a is a theoretical lower limit for suppressing the damage of the steam permeable membrane. Therefore, to improve the reliability, it is more preferable that the thickness T of the first elastic layer 1a be not less than at least twice as thick as the thickness t of the steam permeable membrane.

As above, since the entire main surface of the separator 1 which surface contacts the steam permeable membrane 2 is formed by the first elastic layer 1a made of the elastic body or the second elastic layer 1c made of the elastic body, it can cushion and absorb an external force applied to the steam permeable membrane 2 by, for example, the difference of pressure between the primary fluid and the secondary fluid and the freezing of the discharged cooling water. Thus, the physical damage of the steam permeable membrane 2 can be further suppressed.

Next, respective components of the separator 1 will be explained.

Herein, the elastic body constituting the first and second elastic layers 1a and 1c of the separator 1 is formed by an organic polymer, and specifically, is formed by an elastomer and/or plastic foam. Examples of the elastomer are rubber and a thermoplastic elastomer, and examples of the plastic foam are preferably open-cell foam and flexible foam. Moreover, in a case where a platinum catalyst is used in the fuel cell, as the elastic body constituting the first and second elastic layers 1a and 1c of the separator 1, it is preferable to use fluorocarbon rubber not containing sulfur or peroxide crosslinking EPDM to maintain the activity of the catalyst, and it is preferable to use a polyolefin based thermoplastic elastomer (for example, Santoprene (Product Name) produced by Exxon Mobil Corporation) to facilitate manufacture of the separator and reduce the cost.

Moreover, to maintain the shapes of the first convex portions 67 and 81, hardness of the elastic body (first and second elastic layers 1a and 1c) is preferably 30 or more of A Scale of Durometer Hardness defined in JIS K6200. To suppress the physical damage of the steam permeable membrane 2, the hardness of the elastic body is preferably 100 or less of A Scale of Durometer Hardness defined in JIS K6200. Moreover, in accordance with this configuration, the hardness of the elastic body becomes about the same as the hardness of a sealing member which is typically disposed at the peripheral portion of the separator (To take an O ring as an example, the hardness thereof is 60 of A Scale of Durometer Hardness defined in JIS K6200). Therefore, it is possible to prevent the secondary fluid and the like from leaking to the outside of the humidifying device without providing the sealing member. Thus, it is possible to manufacture the humidifying device having a simpler configuration at low cost.

A material forming the stiff layer 1b of the separator 1 is not especially limited as long as it can maintain the outer shape of the separator 1, and examples of the material are: metals, such as aluminum, copper, iron, and stainless steel; thermosetting resin, such as phenol resin and epoxy resin; and thermoplastic resin, such as polyethylene, polypropylene, polystyrene, polyvinyl chloride, ABS resin, AS resin, acryl resin, polyacetal, polycarbonate, polyamide, polyethylene terephthalate, polybutylene terephthalate, and polysulfone.

Since the separator includes the stiff layer, the separator can have enough strength.

As above, in the humidifying device 100 according to Embodiment 1, a portion of the separator 1 which portion exists up to a predetermined depth from one main surface of the separator 1 and a portion of the separator 1 which portion exists up to a predetermined depth from the other main surface of the separator 1 are formed by the elastic bodies (the first elastic layer 1a and the second elastic layer 1c). With this, the elastic body can cushion and absorb the pressure applied to the steam permeable membrane 2 by, for example, the difference of pressure between the primary fluid and the secondary fluid and the freezing of the discharged cooling water. Thus, the steam permeable membrane 2 can be prevented from being damaged. In addition, the hardness of the main surface of the separator 1 is set to be the same as the hardness of the sealing member which is typically disposed. With this, it is possible to prevent the secondary fluid and the like from leaking without providing the sealing member. Thus, it is possible to manufacture the humidifying device having a simpler configuration at low cost.

A method for manufacturing the separator 1 configured as above may be as follows: for example, the metallic plate provided with a plurality of through holes at appropriate positions thereof is used to form the stiff layer 1b; and the first elastic layer 1a and the second elastic layer 1c are formed on the stiff layer 1b by applying and anchoring fluorocarbon rubber on the stiff layer 1b. Thus, the separator 1 is manufactured. Or, the separator 1 may be manufactured through co-injection molding by forming the stiff layer 1b using polypropylene and forming the first elastic layer 1a and the second elastic layer 1c using a polyolefin based thermoplastic elastomer.

Herein, the separator 1 is constituted by a pair of the first and second elastic layers 1a and 1c and the stiff layer 1b. However, the present embodiment is not limited to this. To be specific, a portion of the separator 1 which portion contacts the steam permeable membrane 2 just has to be constituted by the elastic body. Especially, the portion of the first convex portion 67 which portion forms the first channel 3 or the second channel 4 and contacts the steam permeable membrane 2 may be constituted by the elastic body, since the first convex portion 67 which contacts the steam permeable membrane 2 tends to damage the steam permeable membrane 2. Or, the entire separator 1 may be constituted by the elastic body.

Next, the fuel cell system using the humidifying device according to Embodiment 1 will be explained.

Fuel Cell System

Figure 7:
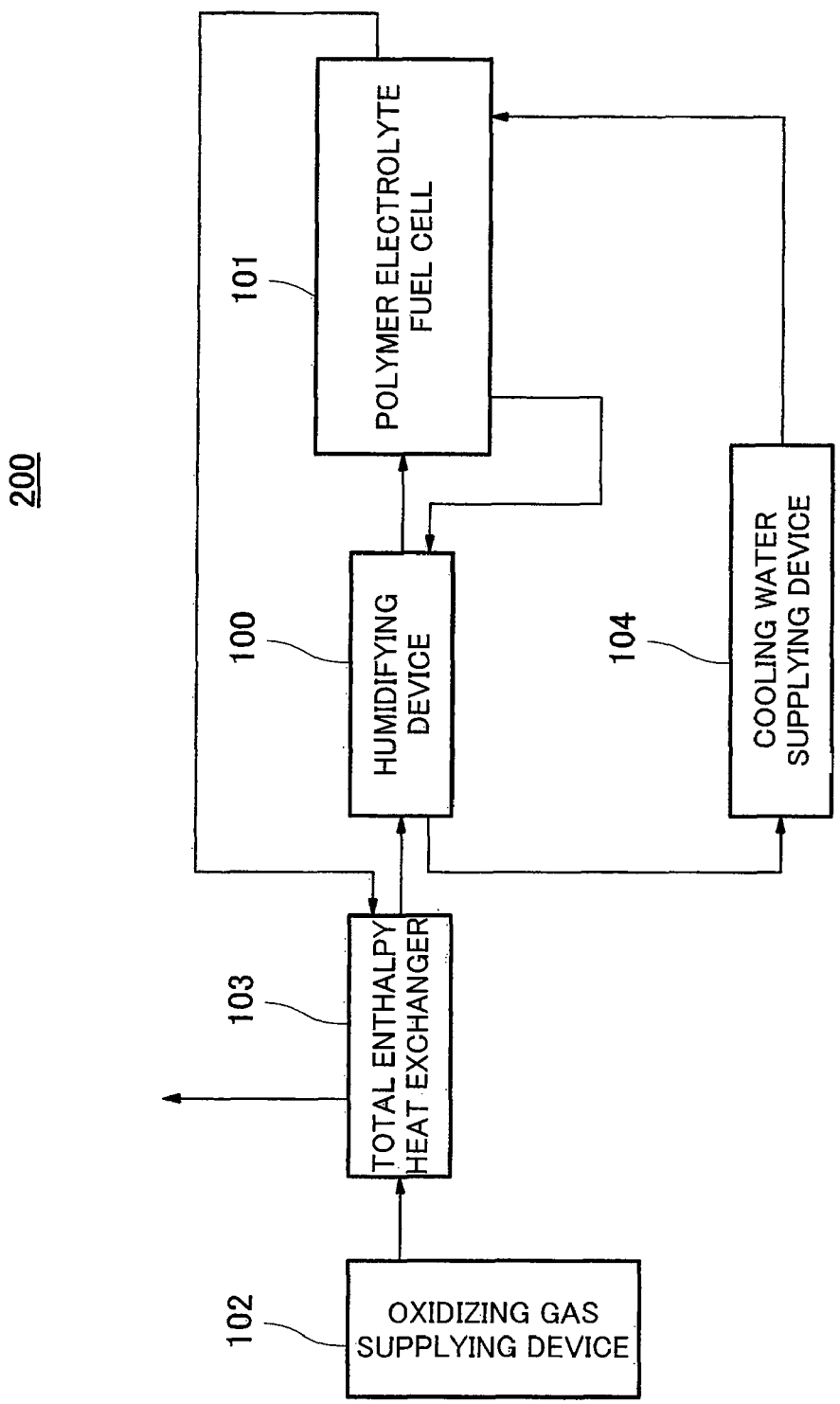
FIG. 7 is a block diagram schematically showing the configuration of a fuel cell system using the humidifying device according to Embodiment 1.
Figure 16:
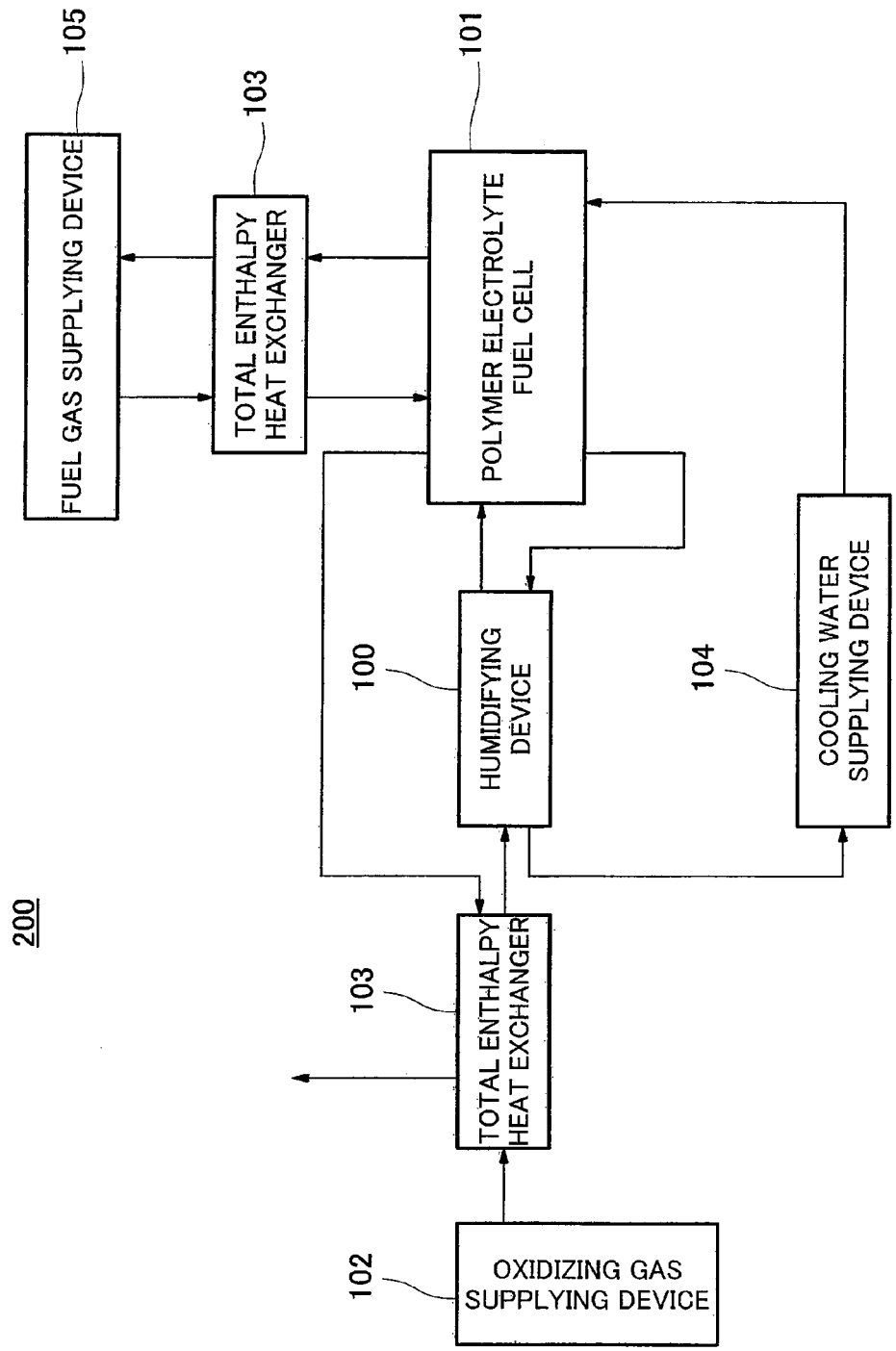
FIG. 16 is a block diagram schematically showing the configuration of the fuel cell system using the humidifying device according to Embodiment 1.

FIGS. 7 and 16 are block diagrams each schematically showing the configuration of the fuel cell system using the humidifying device according to Embodiment 1. In FIGS. 7 and 16, a part of the fuel cell system is omitted.

As shown in FIG. 7, a fuel cell system 200 includes a PEFC 101, an oxidizing gas supplying device 102, a total enthalpy heat exchanger 103, the humidifying device 100, and a cooling water supplying device 104. Since known devices are used as respective devices constituting the fuel cell system 200 other than the humidifying device 100, detailed explanations thereof are omitted.

Hereinafter, the flow of the primary fluid (herein, the discharged cooling water) and the flow of the secondary fluid (herein, the oxidizing gas) will be explained together with the configuration of the fuel cell system 200.

The oxidizing gas is supplied from the oxidizing gas supplying device 102 to the total enthalpy heat exchanger 103. Moreover, an unreacted oxidizing gas is supplied as an off gas from the PEFC 101 to the total enthalpy heat exchanger 103. Herein, the total enthalpy heat exchanger 103 has a total enthalpy heat exchange efficiency of 50%, carries out the heat exchange between the supplied oxidizing gas and off gas, and humidifies the oxidizing gas. Next, the humidified oxidizing gas is supplied to the humidifying device 100, and the supplied oxidizing gas is further humidified in the humidifying device 100 as described above. Then, the oxidizing gas humidified in the humidifying device 100 is supplied to the PEFC 101. In the PEFC 101, the oxidizing gas and the fuel gas supplied separately react with each other to generate electric power, and the unreacted oxidizing gas is supplied to the total enthalpy heat exchanger 103.

Meanwhile, the cooling water is cooled to or heated to an appropriate temperature in the cooling water supplying device 104, and then is supplied to the PEFC 101. The cooling water supplied to the PEFC 101 carries out the heat exchange with the cell stack constituting the PEFC 101, and then is discharged from the PEFC 101. The cooling water (hereinafter referred to as "discharged cooling water") discharged from the PEFC 101 is supplied to the humidifying device 100.

The discharged cooling water supplied to the humidifying device 100 carries out the heat exchange with the oxidizing gas, and then is supplied to the cooling water supplying device 104.

Herein, the oxidizing gas (secondary fluid) is humidified twice. However, the present embodiment is not limited to this. The oxidizing gas may be humidified only by the humidifying device 100 according to Embodiment 1. Or, the off gas discharged from the fuel cell may be used as the primary fluid which humidifies the oxidizing gas. Or, the total enthalpy heat exchanger 103 may be constituted by the humidifying device 100 according to Embodiment 1.

Moreover, as shown in FIG. 16, the humidifying device according to Embodiment 1 may be used as the total enthalpy heat exchanger 103 which humidifies the fuel gas supplied from a fuel gas supplying device 105 to the PEFC 101. Specifically, the fuel gas generated by the fuel gas supplying device 105 is supplied as the secondary fluid to the total enthalpy heat exchanger 103. Meanwhile, since the unused fuel gas (hereinafter referred to as "discharged fuel gas") which has not been used in the PEFC 101 is supplied as the primary fluid to the total enthalpy heat exchanger 103, the fuel gas is humidified in the total enthalpy heat exchanger 103. Then, the humidified fuel gas is supplied to the PEFC 101. Meanwhile, the discharged fuel gas which has carried out water exchange with the fuel gas is supplied as a combustion fuel to a burner, not shown, of the fuel gas supplying device 105.

Embodiment 2

Figure 11:
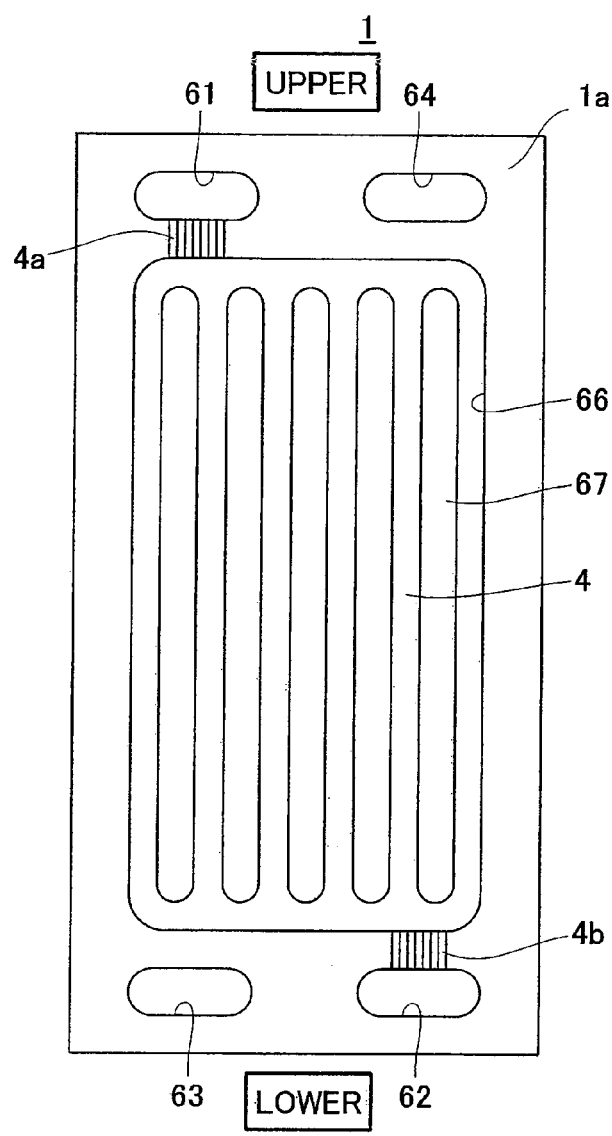
FIG. 11 is a front view schematically showing the configuration of the separator in the humidifying device according to Embodiment 2 of the present invention.

FIG. 11 is a front view schematically showing the configuration of the separator in the humidifying device according to Embodiment 2 of the present invention.

As shown in FIG. 11, the separator 1 according to Embodiment 2 of the present invention is the same in basic configuration as the separator 1 of Embodiment 1. However, the configuration of the first convex portion 67 is different therebetween. Specifically, in Embodiment 1, the first convex portion 67 is formed to have a substantially circular shape in the front view (when viewed from the thickness direction of the separator 1) (see FIG. 3(b)). However, in Embodiment 2, the first convex portion 67 is formed in a band shape extending in the vertical direction of the separator 1 when viewed from the thickness direction of the separator 1. Since a rear surface of the separator 1 is formed in the same manner as a front surface of the separator 1 (since the second convex portion 82 is formed in the same manner as the first convex portion 67), a detailed explanation thereof is omitted.

Even the humidifying device using the separator 1 according to Embodiment 2 configured as above can achieve the same operational advantages as the humidifying device 100 according to Embodiment 1.

Embodiment 3

Figure 12:
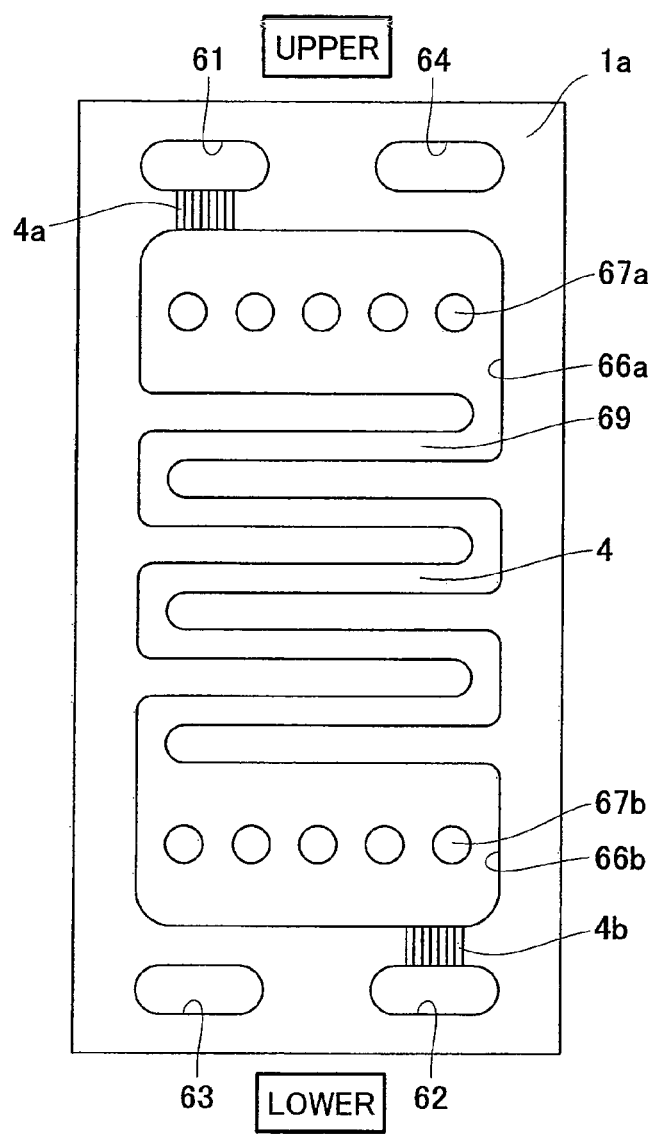
FIG. 12 is a schematic diagram showing the configuration of the separator in the humidifying device according to Embodiment 3 of the present invention.

FIG. 12 is a schematic diagram showing the configuration of the separator in the humidifying device according to Embodiment 3 of the present invention.

As shown in FIG. 12, the separator 1 according to Embodiment 3 of the present invention is the same in basic configuration as the separator 1 of Embodiment 1. However, the configurations of the first concave portion 66 and the first convex portion 67 are different between the separator 1 of Embodiment 3 and the separator 1 of Embodiment 1. Specifically, first concave portions 66a and 66b are formed at upper and lower portions, respectively, of the separator 1. Each of the first concave portions 66a and 66b has a substantially square shape in the front view, and corner portions thereof are rounded. In the first concave portion 66a, a large number of first convex portions 67a are formed to project from a bottom surface of the first concave portion 66a in the thickness direction, and in the first concave portion 66b, a large number of first convex portions 67b are formed to project from a bottom surface of the first concave portion 66b in the thickness direction. Then, a groove-like channel 69 is formed to connect one side portion of a lower end of the first concave portion 66a and one side portion of an upper end of the first concave portion 66b. A portion of the first concave portion 66a at which portion the first convex portions 67a are not formed, a portion of the first concave portion 66b at which portion the first convex portions 67b are not formed, and a channel 69 constitute the second channel 4. Since the rear surface of the separator 1 is formed in the same manner as the front surface of the separator 1, a detailed explanation thereof is omitted.

Even the humidifying device using the separator 1 according to Embodiment 3 configured as above can achieve the same operational advantages as the humidifying device 100 according to Embodiment 1.

Embodiment 4

Figure 13:
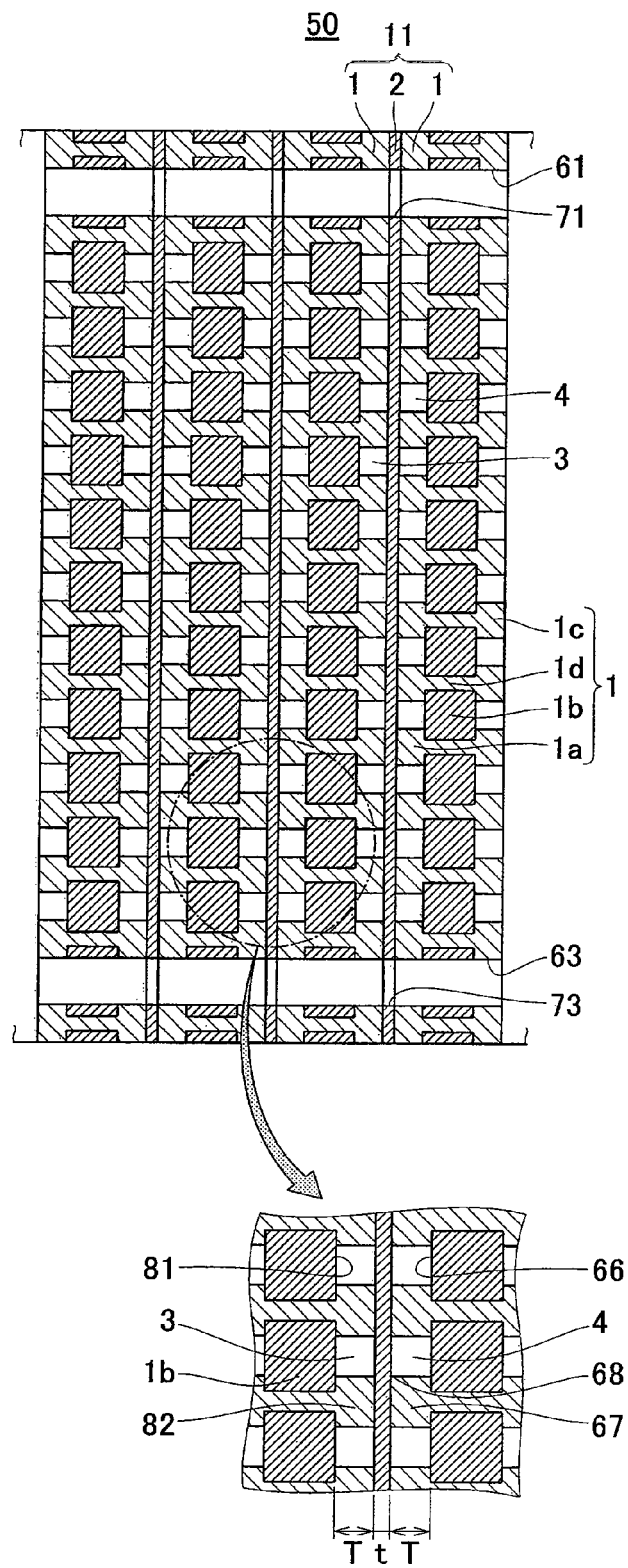
FIG. 13 is a cross-sectional view schematically showing the configuration of the humidifying cell stack body of the humidifying device according to Embodiment 4 of the present invention.

FIG. 13 is a cross-sectional view schematically showing the configuration of the humidifying cell stack body of the humidifying device according to Embodiment 4 of the present invention. In FIG. 13, a part of the humidifying cell stack body is omitted.

As shown in FIG. 13, the humidifying cell 11 of the humidifying device according to Embodiment 4 of the present invention and the humidifying cell 11 of the humidifying device 100 according to Embodiment 1 are the same in basic configuration as each other. However, they are different from each other in that the bottom surface of the first concave portion 66 is formed by the stiff layer 1b. To be specific, the first and second elastic layers 1a and 1c are formed on the surfaces, respectively, of the stiff layer 1b to project therefrom. Then, a portion of the surface of the stiff layer 1b on which surface the first elastic layer 1a is not formed constitutes the bottom surface of the first concave portion 66, and a portion of the surface of the stiff layer 1b on which surface the second elastic layer 1c is not formed constitutes the bottom surface of the second concave portion 81. Moreover, a portion, other than a peripheral portion, of a projecting portion of the first elastic layer 1a which portion is projecting from the surface of the stiff layer 1b constitutes a wall portion of the first convex portion 67, and a portion, other than a peripheral portion, of a projecting portion of the second elastic layer 1c which portion is projecting from the surface of the stiff layer 1b constitutes a wall portion of the second convex portion 82.

With this configuration, the first and second elastic layers 1a and 1c can be reduced in volume while maintaining the operational advantages of Embodiment 1. In a case where the first and second elastic layers 1a and 1c are formed by an expensive elastic body, it is possible to reduce the cost of the separator 1, and therefore, reduce the cost of the fuel cell system.

Embodiment 5

Figure 14:
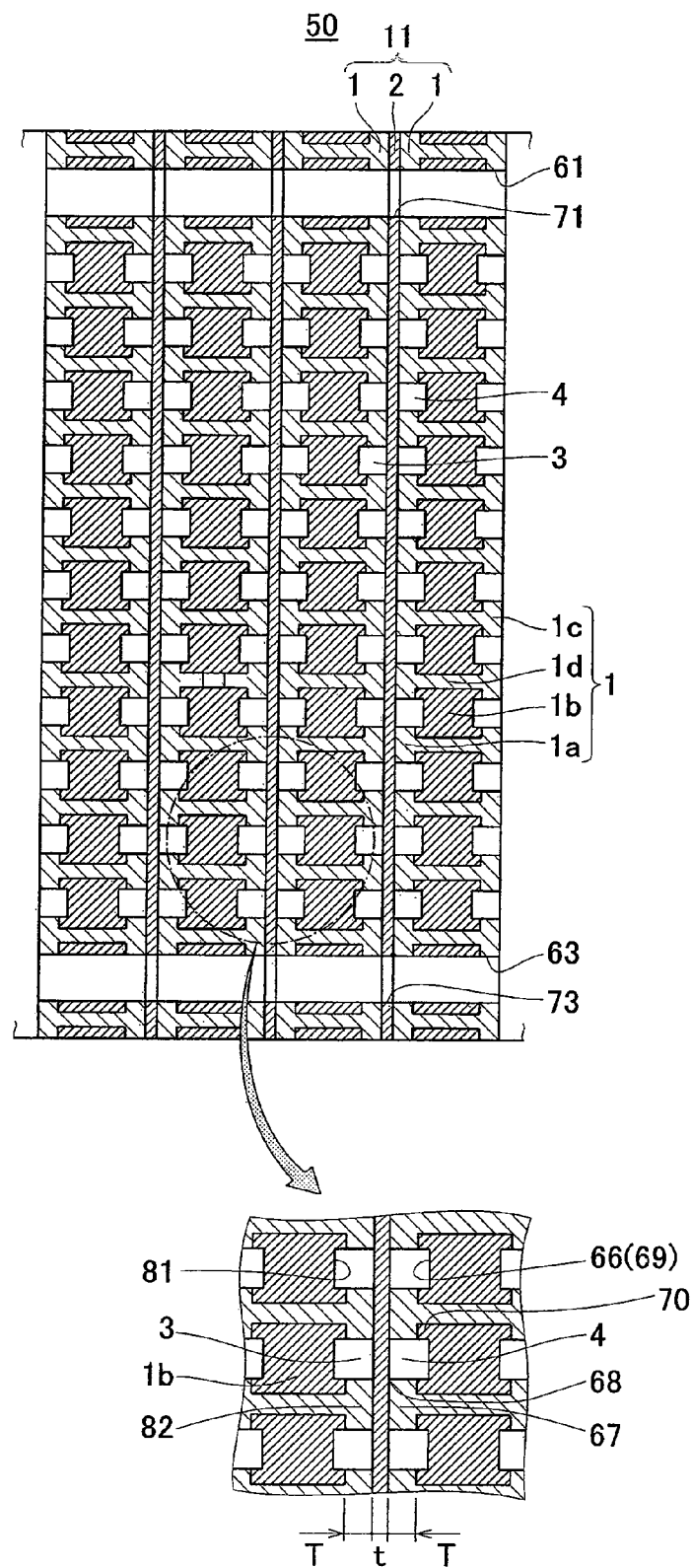
FIG. 14 is a cross-sectional view schematically showing the configuration of the humidifying cell stack body of the humidifying device according to Embodiment 5 of the present invention.
Figure 17:
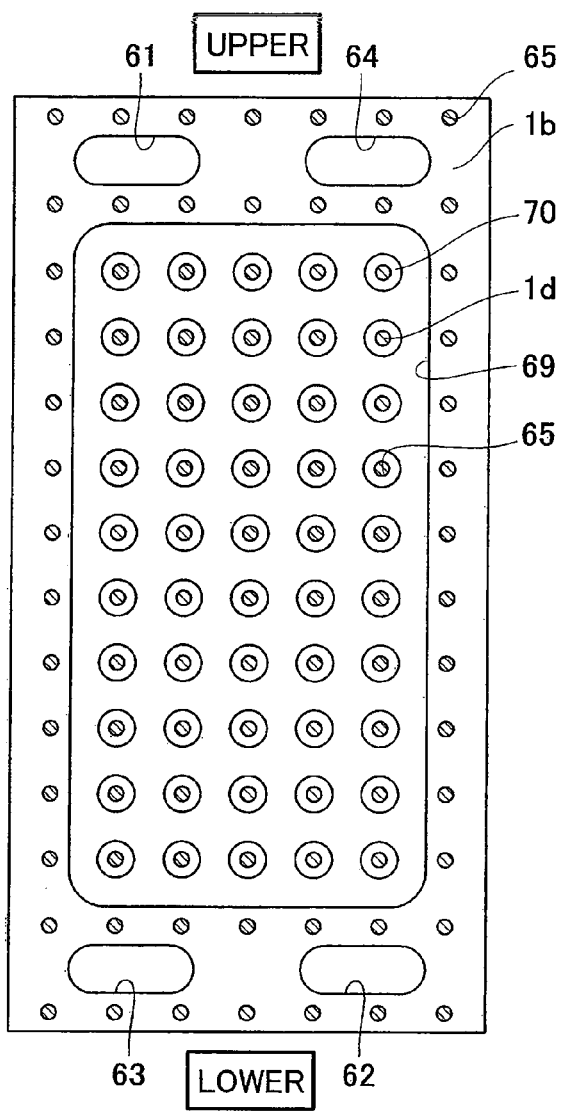
FIG. 17 is a schematic diagram showing the configuration of the stiff layer constituting the separator of the humidifying cell stack body shown in FIG. 14.

FIG. 14 is a cross-sectional view schematically showing the configuration of the humidifying cell stack body of the humidifying device according to Embodiment 5 of the present invention. FIG. 17 is a schematic diagram showing the configuration of the stiff layer 1b constituting the separator 1 of the humidifying cell stack body 50 shown in FIG. 14. In FIG. 14, a part of the humidifying cell stack body is omitted.

As shown in FIGS. 14 and 17, the humidifying cell 11 of the humidifying device according to Embodiment 5 of the present invention and the humidifying cell 11 of the humidifying device 100 according to Embodiment 1 are the same in basic configuration as each other, but are different from each other as below. To be specific, a concave portion 69 having a substantially square shape in the front view is formed on the main surface of the stiff layer 1b, and a plurality of convex portions 70 projecting in the thickness direction are formed on a bottom surface of the concave portion 69 of the stiff layer 1b (see FIG. 17). In each convex portion 70, a through hole 65 which penetrates through the convex portion 70 in the thickness direction is formed.

Moreover, each of the first and second elastic layers 1a and 1c is formed to project from the main surfaces (surface) of the convex portions 70 and a peripheral portion (portion where the concave portion 69 is not formed) of the main surface of the stiff layer 1b. Then, the concave portion 69 of the stiff layer 1b constitutes the first concave portion 66 or the second concave portion 81, the convex portions 70 and the first elastic layer 1a projecting from the surfaces of the convex portions 70 constitute the wall portions of the first convex portions 67, and the convex portions 70 and the second elastic layer 1c projecting from the surfaces of the convex portions 70 constitute the wall portions of the second convex portions 82. The thickness T of each of the first and second elastic layers 1a and 1c is set to be not less than 1.66 times (herein, 1.67 times) as large as the thickness t of the steam permeable membrane 2.

With this configuration, the first and second elastic layers 1a and 1c can be further reduced in volume while maintaining the operational advantages of Embodiment 1. In a case where the first and second elastic layers 1a and 1c are formed by an expensive elastic body, it is possible to reduce the cost of the separator 1, and therefore, reduce the cost of the fuel cell system.

Moreover, since the stiff layer 1b serves as a core, the shapes of the first convex portion 67 and the second convex portion 82 are maintained stably for a long period of time. Therefore, it is possible to avoid problems, such as clogging of the second channel 4 or the first channel 3 due to deformation of the first convex portion 67 or the second convex portion 82.

Embodiment 6

Figure 15:
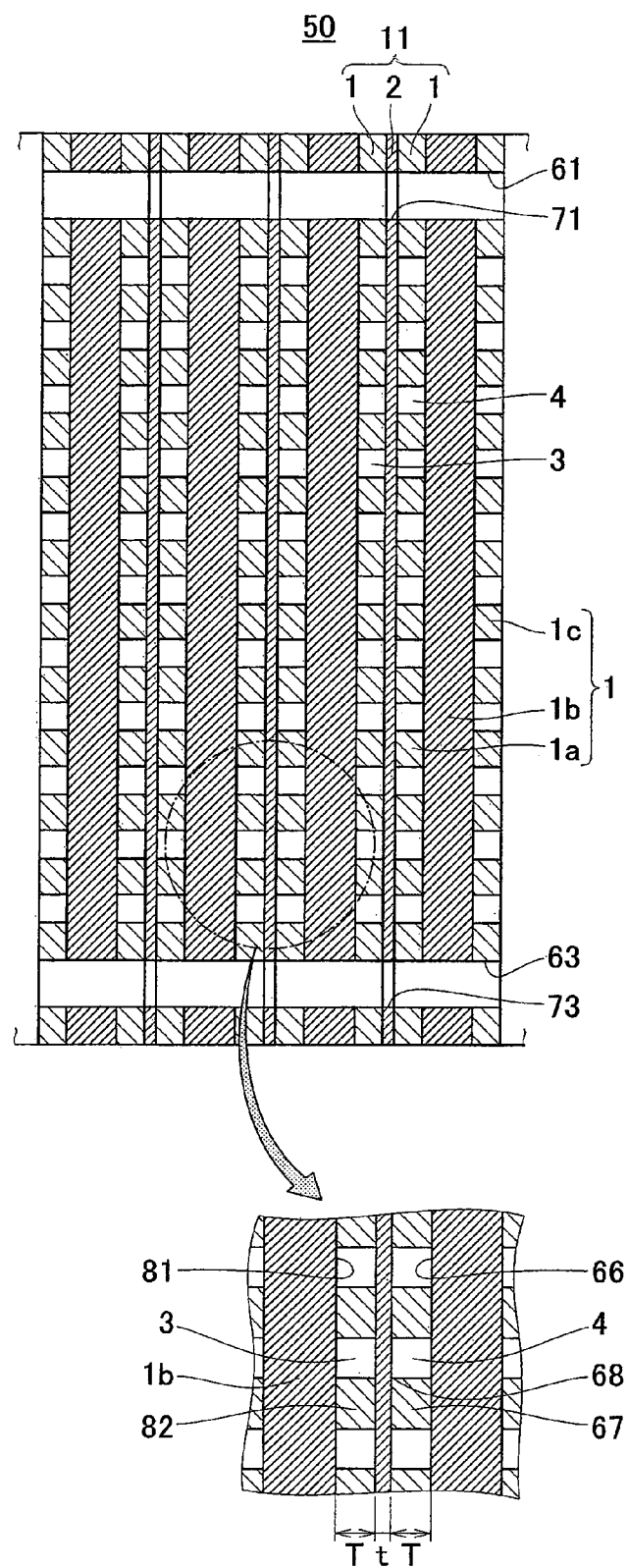
FIG. 15 is a cross-sectional view schematically showing the configuration of the humidifying cell stack body of the humidifying device according to Embodiment 6 of the present invention.

FIG. 15 is a cross-sectional view schematically showing the configuration of the humidifying cell stack body of the humidifying device according to Embodiment 6 of the present invention. In FIG. 15, a part of the humidifying cell stack body is omitted.

As shown in FIG. 15, the humidifying cell 11 of the humidifying device according to Embodiment 6 of the present invention and the humidifying cell 11 of the humidifying device 100 according to Embodiment 1 are the same in basic configuration as each other. However, they are different from each other in that: the through hole 65 is not formed on the stiff layer 1b; the bottom surface of the first concave portion 66 or the second concave portion 81 is formed by the stiff layer 1b; and each of the first convex portion 67 and the second convex portion 82 is formed to project from the main surface of the stiff layer 1b. The separator 1 of the humidifying device 11 according to Embodiment 6 can be manufactured through the co-injection molding by forming the stiff layer 1b and the first and second elastic layers 1a and 1c using the same olefine based materials (for example, the stiff layer 1b is formed by polypropylene, and the first elastic layer 1a and the second elastic layer 1c are formed by a polyolefin based thermoplastic elastomer).

With this configuration, the first and second elastic layers 1a and 1c can be further reduced in volume while maintaining the operational advantages of Embodiment 1. In a case where the first and second elastic layers 1a and 1c are formed by an expensive elastic body, it is possible to reduce the cost of the separator 1, and therefore, reduce the cost of the fuel cell system.

Embodiment 7

Figure 18:
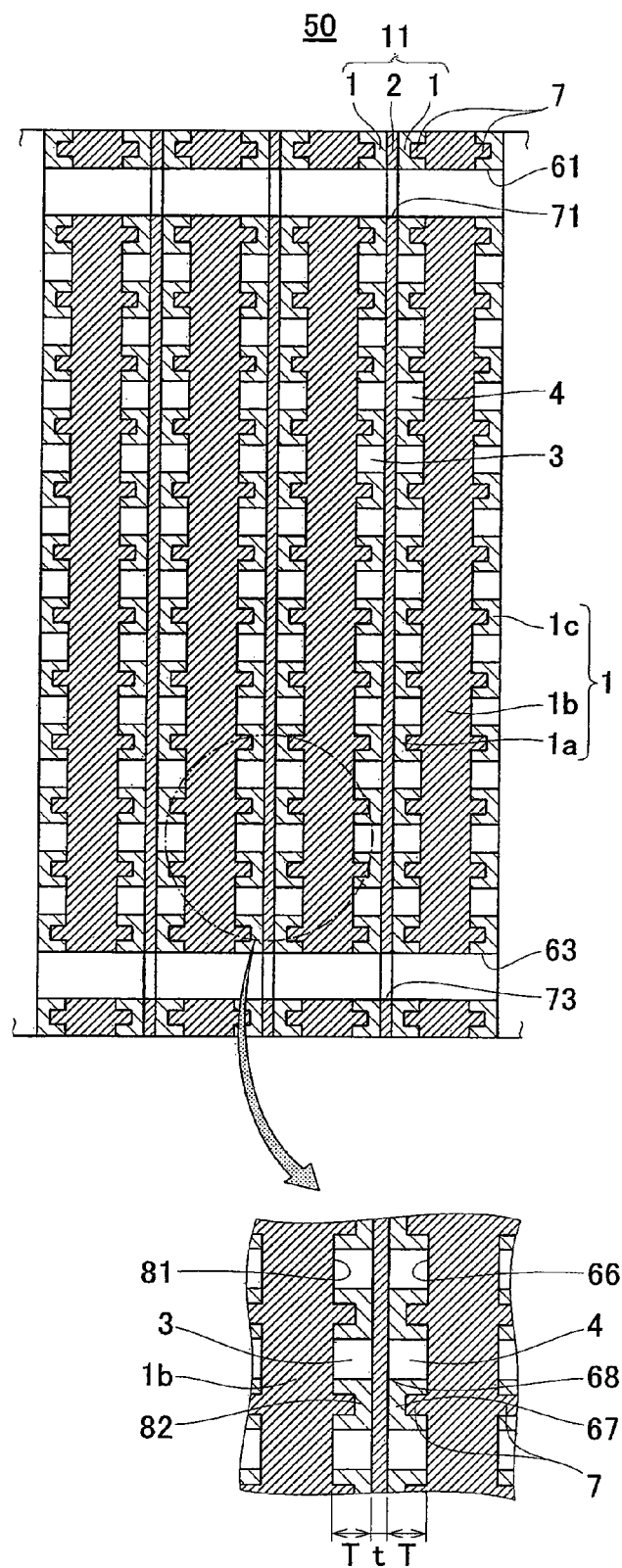
FIG. 18 is a cross-sectional view schematically showing the configuration of the humidifying cell stack body of the humidifying device according to Embodiment 7 of the present invention.

FIG. 18 is a cross-sectional view schematically showing the configuration of the humidifying cell stack body of the humidifying device according to Embodiment 7 of the present invention. In FIG. 18, a part of the humidifying cell stack body is omitted.

As shown in FIG. 18, the humidifying cell 11 of the humidifying device according to Embodiment 7 of the present invention and the humidifying cell 11 of the humidifying device 100 according to Embodiment 6 are the same in basic configuration as each other. However, they are different from each other in that: a plurality of projecting portions 7 projecting in a thickness direction of the stiff layer 1b are formed on the main surfaces of the stiff layer 1b; and the first and second elastic layers 1a and 1c are formed to cover the projecting portions 7.

With this configuration, the first and second elastic layers 1a and 1c can be further reduced in volume while maintaining the operational advantages of Embodiment 1. In a case where the first and second elastic layers 1a and 1c are formed by an expensive elastic body, it is possible to reduce the cost of the separator 1, and therefore, reduce the cost of the fuel cell system.

Moreover, since the stiff layer 1b serves as a core, the shapes of the first convex portion 67 and the second convex portion 82 are maintained stably for a long period of time. Therefore, it is possible to avoid problems, such as clogging of the second channel 4 or the first channel 3 due to deformation of the first convex portion 67 or the second convex portion 82.

In Embodiments 1 to 4, and 6, the first convex portion 67 of the separator 1 which portion forms the first channel 3 through which the primary fluid flows and the second convex portion 82 of the separator 1 which portion forms the second channel 4 through which the secondary fluid flows are formed by the elastic body. However, the present invention is not limited to this. As described in Embodiment 5 or 7, a portion of each of the first convex portion 67 and the second convex portion 82 which portion exists up to a predetermined depth (which is not less than 1.66 times as large as the thickness t of the steam permeable membrane 2) from its surface contacting the steam permeable membrane 2 may be formed by the elastic body, and the stiff layer 1b may be formed as the core of the first convex portion 67 and the second convex portion 82. Moreover, in Embodiments 1 to 7, the peripheral portion of the main surface of the separator 1 is formed by the elastic body. However, the present invention is not limited to this. The peripheral portion of the main surface of the separator 1 may be formed by the stiff layer 1b.

Next, a performance evaluation test of the humidifying device 100 according to Embodiment 1 will be explained together with Examples. In the following explanation, the cooling water is used as the primary fluid, and the oxidizing gas is used as the secondary fluid.

Example 1

A humidifying device of Example 1 was manufactured so as to have the same configuration as the humidifying device 100 according to Embodiment 1.

The separator 1 was formed through the co-injection molding by using glass filler-containing polypropylene (R350G (Product Name) produced by Prime Polymer Co., Ltd.) and a polyolefin based thermoplastic elastomer (Santoprene 8260 (Product Name) produced by Exxon Mobil Corporation, Hardness: 60 of A Scale). At this time, the separator 1 was formed such that the first concave portion 66 constituting each of the first channel (hereinafter referred to as "cooling water channel") 3 and the second channel (hereinafter referred to as "oxidizing gas channel") 4 of the separator 1 has a length of 100 mm in a longer direction, a width of 50 mm in a shorter direction, (effective humidification area is 0.03 m$^2$), and a depth of 1 mm.

A perfluoro sulfonic acid membrane (Nafion 117 (Product Name) produced by Du Pond) was used as the steam permeable membrane 2, and manifold holes, such as the oxidizing gas supply manifold hole 71, were formed at predetermined positions of the membrane.

A required number of the separators 1 formed as above and a required number of the steam permeable membranes 2 were stacked to form a humidifying cell stack body 51. Fastener plates were disposed on both ends, respectively, of the humidifying cell stack body 51 to sandwich and fasten the humidifying cell stack body 51. Thus, the humidifying device 100 was manufactured.

Comparative Example 1

Figure 4A:
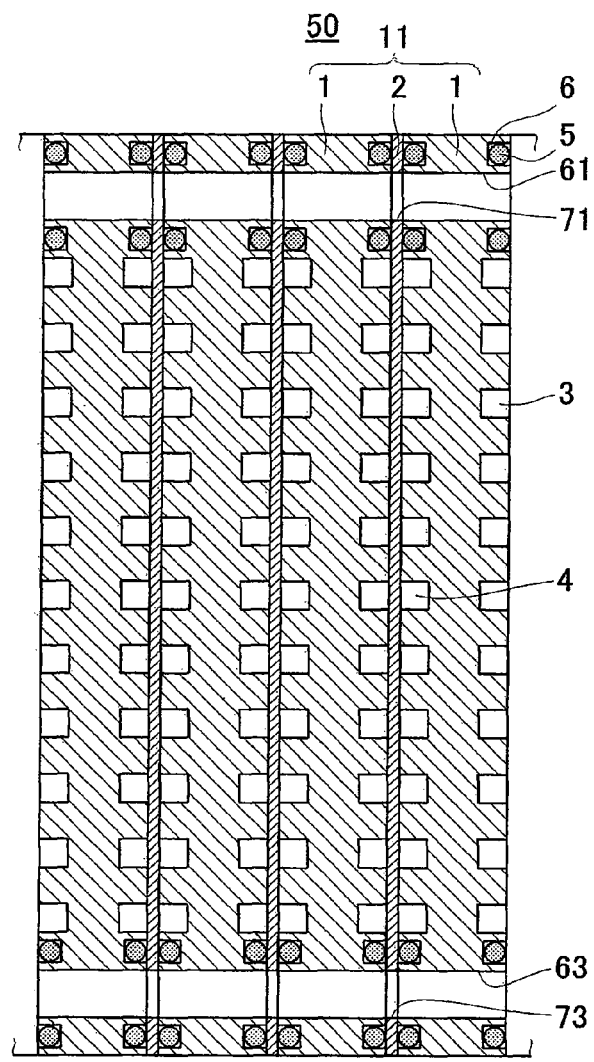
FIG. 4(a) is a cross-sectional view schematically showing the configuration of a humidifying cell stack body in the humidifying device of Comparative Example 1.
Figure 4B:
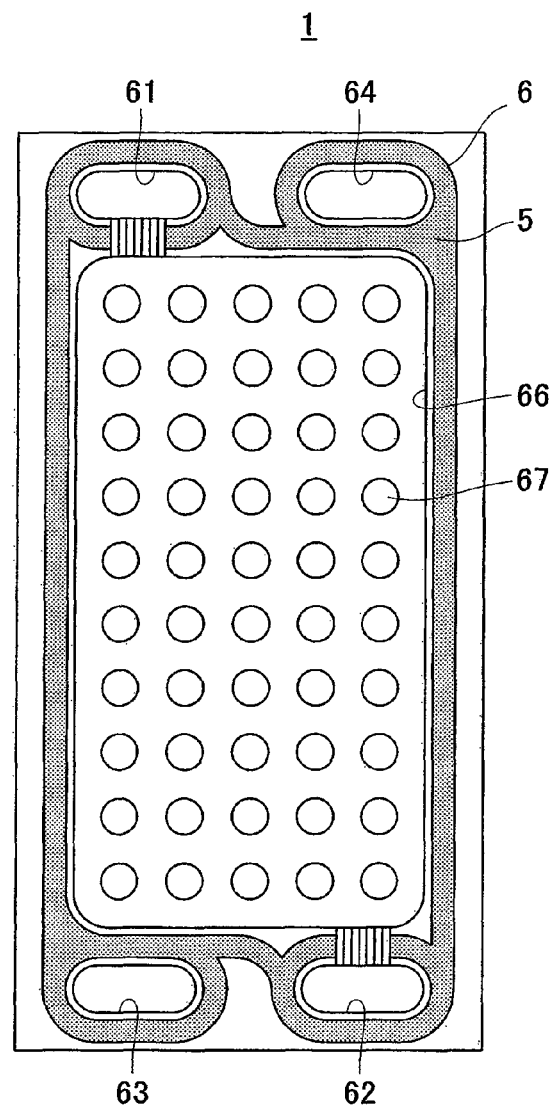
FIG. 4(b) is a schematic diagram showing the configuration of the separator of the humidifying cell shown in FIG. 4(a).

FIG. 4(a) is a cross-sectional view schematically showing the configuration of the humidifying cell stack body 50 in a humidifying device 100a of Comparative Example 1. FIG. 4(b) is a schematic diagram showing the configuration of the separator 1 of the humidifying cell 11 shown in FIG. 4(a). In FIG. 4(a), a part of the humidifying cell stack body 50 is omitted.

The separator 1 used in Comparative Example 1 was formed to be the same in basic configuration as the separator 1 of Example 1 but be different from the separator 1 of Example 1 as below.

As shown in FIG. 4(b), a groove 6 on which a gasket (fluid seal) 5 was disposed was formed on the peripheral portion of the main surface of the separator 1 used in Comparative Example 1 so as to surround the cooling water channel 3 (or the oxidizing gas channel 4) and the manifold holes, such as the oxidizing gas supply manifold hole 61. Moreover, as shown in FIG. 4(a), the separator 1 of Comparative Example 1 did not include the first elastic layer 1a and the second elastic layer 1c, and was formed by only the glass filler-containing polypropylene (that is, only the stiff layer 1b).

The same steam permeable membrane 2 as in Example 1 was used herein. Moreover, used as the gasket 5 was a piece which was cut from the peroxide crosslinking EPDM so as to have a suitable shape.

Then, a required number of the separators 1 in each of which the gasket 5 was disposed in the groove 6 and a required number of the steam permeable membranes 2 were stacked to form the humidifying cell stack body 51. The fastener plates were disposed on both ends, respectively, of the humidifying cell stack body 51 to sandwich and fasten the humidifying cell stack body 51. Thus, the humidifying device 100a was manufactured.

Comparative Example 2

Figure 5A:
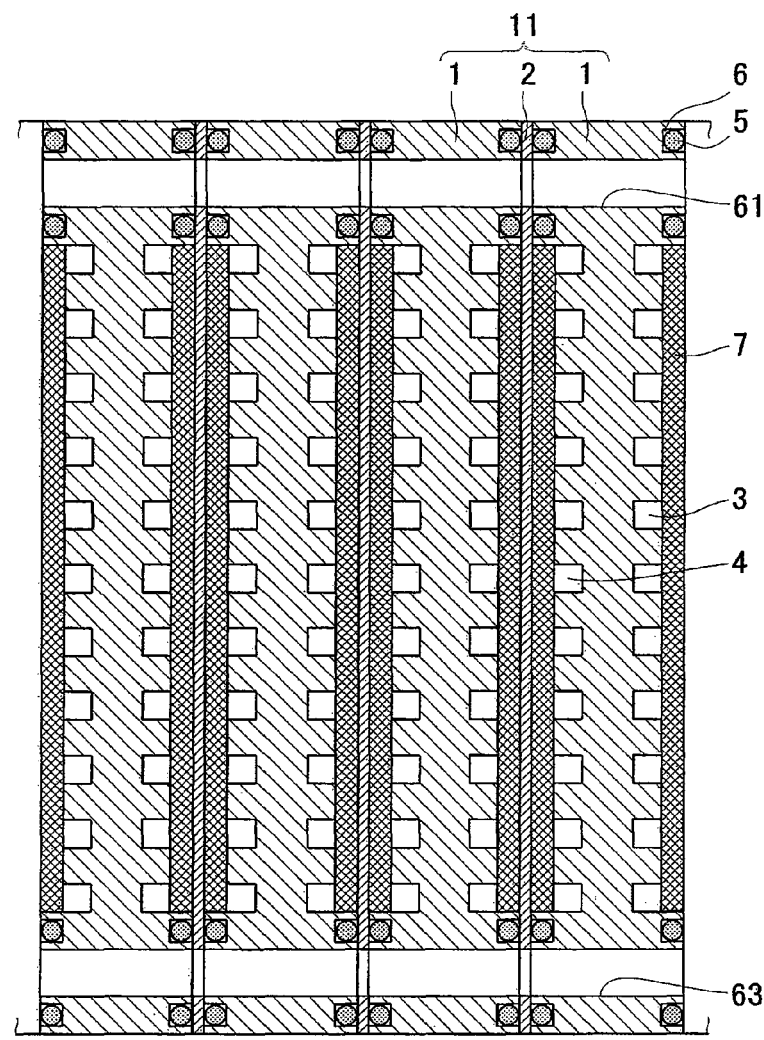
FIG. 5(a) is a cross-sectional view schematically showing the configuration of the humidifying cell stack body in the humidifying device of Comparative Example 2.
Figure 5B:
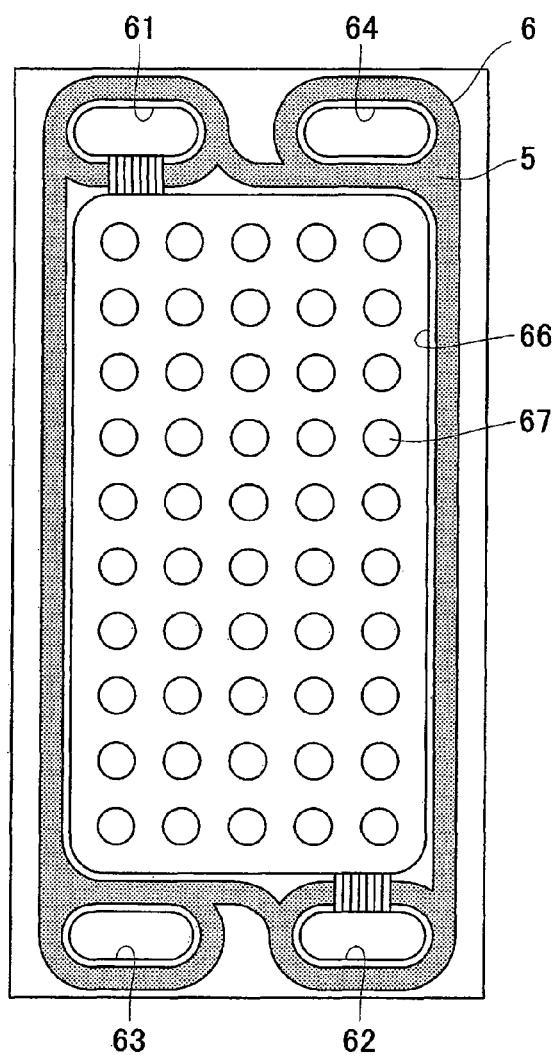
FIG. 5(b) is a schematic diagram showing the configuration of the separator of the humidifying cell shown in FIG. 5(a).

FIG. 5(a) is a cross-sectional view schematically showing the configuration of the humidifying cell stack body 50 in a humidifying device 100b of Comparative Example 2. FIG. 5(b) is a schematic diagram showing the configuration of the separator 1 of the humidifying cell 11 shown in FIG. 5(a). In FIG. 5(a), a part of the humidifying cell stack body 50 is omitted.

The humidifying device 100b of Comparative Example 2 was configured to include, as a membrane supporting portion disclosed in Patent Document 3, a membrane protective member 7 shown in FIGS. 5(a) and 5(b). To facilitate comparison between Comparative Example 2 and Example 1 and comparison between Comparative Example 2 and Comparative Example 1, the separator 1 of Comparative Example 2 was formed to be the same in basic configuration as the separator 1 of Comparative Example 1 but be different from the separator 1 of Comparative Example 1 as below.

As shown in FIG. 5(a), in the separator 1 of Comparative Example 2, the peripheral portion of each of both main surfaces of the separator 1 was formed to project in the thickness direction of the separator 1 from an upper end surface of the first convex portion 67 by the thickness of the membrane protective member 7 such that the membrane protective member 7 could be disposed on the oxidizing gas channel 4 (or the cooling water channel 3).

Herein, a 60-mesh polypropylene mesh (opening ratio: 60%) was used as the membrane protective member 7, and was cut so as to snugly fit in the first concave portion 66. Moreover, the same steam permeable membrane 2 as in Example 1 and Comparative Example 2 was used herein.

Then, the gasket 5 was disposed on the groove 6 of the separator 1, and the membrane protective member 7 was disposed on the first concave portion 66. A required number of the separators 1 and a required number of the steam permeable membranes 2 were stacked to form the humidifying cell stack body 51. The fastener plates were disposed on both ends, respectively, of the humidifying cell stack body 51 to sandwich and fasten the humidifying cell stack body 51. Thus, the humidifying device 100b was manufactured.

Next, the performance evaluation tests were carried out using these humidifying devices.

Performance Evaluation Test 1

Performance Evaluation Test 1 was carried out using the humidifying device 100 of Example 1 which was manufactured such that a pair of the separators 1 sandwich the steam permeable membrane 2 (such humidifying device is hereinafter referred to as "humidifying device of one set type"), and the humidifying device 100b of one set type of Comparative Example 2. A method for carrying out Performance Evaluation Test 1 was as follows: the cooling water of 70° C. was caused to flow through the cooling water channel 3 at a flow rate of 3.3 m/sec; dry air (oxidizing gas) whose dew point conversion temperature (temperature obtained by converting the total water amount in the gas into the dew point) was not more than 10° C. was caused to flow through the oxidizing gas channel 4 at a flow rate of 30 m/sec; and the steam content (dew point) of the oxidizing gas discharged from the humidifying device was measured. Then, the steam permeability coefficient was calculated using the measured dew point and Formulas (1) and (2), and the steam permeability coefficient and the flow rate of the oxidizing gas were plotted. Results are shown in FIG. 6.

Figure 6:
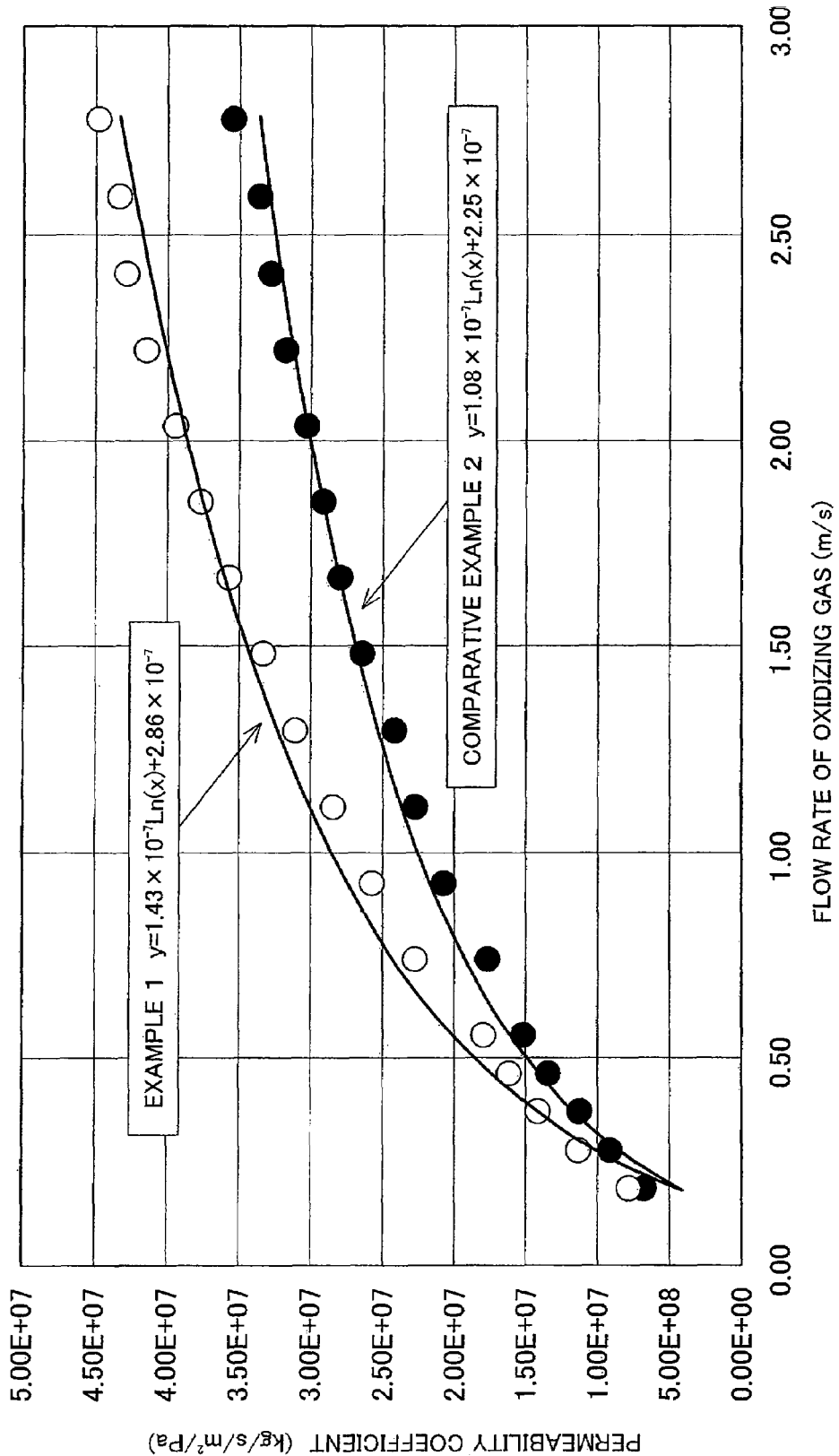
FIG. 6 is a graph plotting a dew point of an oxidizing gas discharged from the humidifying device of Example 1 or the humidifying device of Comparative Example 2 and a steam permeability coefficient.

As shown in FIG. 6, an approximate curve of the steam permeability coefficient of the humidifying device 100 of Example 1 became an approximate curve represented by Formula (3). Meanwhile, an approximate curve of the steam permeability coefficient of the humidifying device 100b of Comparative Example 2 became an approximate curve represented by Formula (4).

$$y=1.43\times10^{-7}\text{Ln}(x)+2.86\times10^{-7} \tag{3}$$

$$y=1.08\times10^{-7}\text{Ln}(x)+2.25\times10^{-7} \tag{4}$$

Here, y denotes the steam permeability coefficient, and x denotes the flow rate of the oxidizing gas.

With this, it was found that in the humidifying device 100b of Comparative Example 2, the effective area of the steam permeable membrane 2 was reduced by the opening ratio of the membrane protective member 7, and the humidification performance per unit area of the steam permeable membrane 2 was decreased by about 20%.

Next, how the difference of the humidification performance between the humidifying device 100 of Example 1 and the humidifying device 100b of Comparative Example 2 affects the actual fuel cell system was tested.

Performance Evaluation Test 2

In Performance Evaluation Test 2, the fuel cell system 200 shown in FIG. 7 was configured, and used as the PEFC 101 was a fuel cell having an electric power output of 4.8 kW.

In the fuel cell system 200 configured as above, to obtain the above output of the PEFC 101, the PEFC 101 required 59.4 L/min of the fuel gas which was humidified up to a saturated state at 63° C. and 212.2 L/min of the oxidizing gas which was humidified up to a saturated state at 63° C., under excessive reactant gas conditions that a fuel gas utilization ratio was 75% and an oxidizing gas utilization ratio was 50%. Moreover, the cooling water of 60° C. was supplied to the cell stack of the PEFC 101 at 5.8 L/min for the heat exchange in the cell stack, and was discharged as the discharged cooling water of 71.5° C.

Next, the design of the humidifying device which is necessary for humidifying the oxidizing gas will be explained.

FIG. 8 is a table showing design conditions of the humidifying device 100 of Example 1 and design conditions of the humidifying device 100b of Comparative Example 2.

As described above, the oxidizing gas was humidified by the total enthalpy heat exchanger 103. At this time, the oxidizing gas was heated and humidified until its dew point became 58° C. In order to humidify the humidified oxidizing gas until its dew point became 63° C., the humidifying device required 12.50 g/min of the humidification ability as shown in FIG. 8.

Here, the steam permeability coefficients of the humidifying device 100 of Example 1 and the humidifying device 100b of Comparative Example 2 were calculated from the approximate curves (Formulas (3) and (4)) of the steam permeability coefficients of the humidifying device 100 of Example 1 and the humidifying device 100b of Comparative Example 2 shown in FIG. 6. Thus, the humidification ability of each humidifying device was calculated. As a result, as shown in FIG. 8, it was found that in the humidifying device 100 of Example 1, the humidification ability became 13.71 g/min by stacking six humidifying cells 11 (six steam permeable membranes 2), so that the oxidizing gas could be humidified until its dew point became 63° C. Meanwhile, it was found that in the humidifying device 100b of Comparative Example 2, as shown in Comparative Example 2-1 of FIG. 8, the required humidification ability could not be obtained even by stacking six humidifying cells 11, and eight humidifying cells 11 needed to be stacked. This was because by increasing the number of the stacked humidifying cells 11, the flow rate of the air (oxidizing gas) was decreased, and a further larger humidification area was required.

Then, each of these three humidifying devices (humidifying devices shown in FIG. 8) was mounted on the fuel cell system, and the fuel cell system was operated to measure the dew point of the oxidizing gas discharged from the humidifying device. As a result, each dew point was within a range of ±0.5° C. of a designed value calculated from the humidification ability of each humidifying device, that is, the dew point adequately coincided with the designed value.

As above, the humidifying device 100 of Example 1 had higher humidification performance than the humidifying device 100b of Comparative Example 2 in a state where the number of the stacked humidifying cells 11 of the humidifying device 100 of Example 1 was smaller than that of the humidifying device 100b of Comparative Example 2. On this account, in accordance with the fuel cell system on which the humidifying device 100 of Example 1 was mounted, the space saving and the cost reduction could be realized.

Next, a test for confirming the mechanical durability of each humidifying device was carried out. Used in the following test were the humidifying device 100 of Example 1, the humidifying device 100a of Comparative Example 1, and the humidifying device 100b of Comparative Example 2, each of which was manufactured by stacking and fastening ten cells 11.

Performance Evaluation Test 3

Performance Evaluation Test 3 was carried out as below.

Test 1: Repetitive Differential Pressure Test

In Repetitive Differential Pressure Test, first, the cooling water channel 3 and the oxidizing gas channel 4 of each humidifying device were exposed to atmospheric pressure, the oxidizing gas channel 4 was maintained at 0.5 kPa for one minute from the end of the exposure to the atmospheric pressure, and the oxidizing gas channel 4 was again exposed to the atmospheric pressure. This cycle was considered as one cycle, and 500 cycles were considered as one period. Whether or not the leakage (cross leakage) between the cooling water channel 3 and the oxidizing gas channel 4 occurred was measured at the time of the termination of one period at 0.5 kPa of the differential pressure between these channels. In a case where the amount of the leaked oxidizing gas was not more than 2 cc/min, the humidifying device passed the test regarding this one period. The humidifying device which passed the test regarding one period was subjected to the test regarding the next period. This was repeated for ten periods. Then, whether or not the humidifying device passed the test was finally determined.

Test 2: Repetitive Freezing Test

In Repetitive Freezing Test, first, the oxidizing gas channel 4 of each humidifying device was hermetically sealed, the cooling water channel 3 thereof was sealed by water, and the humidifying device was kept in a constant temperature tank. Then, the humidifying device was cooled down for six hours at −10° C. to freeze the inside of the humidifying device. After that, the humidifying device was heated for six hours at 10° C. to melt down the frozen water. This cycle was considered as one cycle, and 20 cycles were considered as one period. Whether or not the leakage (cross leakage) between the cooling water channel 3 and the oxidizing gas channel 4 occurred was measured at the time of the termination of one period at 0.5 kPa of the differential pressure between these channels. In a case where the amount of the leaked oxidizing gas was not more than 2 cc/min, the humidifying device passed the test regarding this one period. The humidifying device which passed the test regarding one period was subjected to the test regarding the next period. This was repeated for ten periods. Then, whether or not the humidifying device passed the test was finally determined.

As a result of Repetitive Differential Pressure Test, both the humidifying device 100 of Example 1 and the humidifying device 100b of Comparative Example 2 finally passed the test. To be specific, the cross leakage did not occur between the cooling water channel 3 and the oxidizing gas channel 4. In contrast, in accordance with the humidifying device 100a of Comparative Example 1, the cross leakage occurred in the fourth period.

Moreover, as a result of Repetitive Freezing Test, both the humidifying device 100 of Example 1 and the humidifying device 100b of Comparative Example 2 finally passed the test. To be specific, the cross leakage did not occur between the cooling water channel 3 and the oxidizing gas channel 4. In contrast, in accordance with the humidifying device 100a of Comparative Example 1, the cross leakage occurred in the sixth period.

The humidifying device 100a of Comparative Example 1 was dismantled to find out the reason why it could not pass the test. As a result, found on the steam permeable membrane 2 were pin holes which might be made by the contact between the steam permeable membrane 2 and the first convex portions 67 formed on the cooling water channel 3 (first concave portion 66) of the separator 1 or between the steam permeable membrane 2 and the second convex portions 82 formed on the oxidizing gas channel 4 (second concave portion 81) of the separator 1. In contrast, although each of the humidifying device 100 of Example 1 and the humidifying device 100b of Comparative Example 2, both of which passed the test, was dismantled, it was confirmed that the steam permeable membrane 2 in each of the humidifying device 100 of Example 1 and the humidifying device 100b of Comparative Example 2 was not damaged. Thus, it was confirmed that the humidifying device 100 of Example 1 had the same mechanical durability performance as the humidifying device of the conventional example.

INDUSTRIAL APPLICABILITY

A separator for use in a humidifying device, the humidifying device, and a fuel cell system including the humidifying device according to the present invention are useful since physical damages caused due to the differential pressure, the freezing, and the like can be prevented with a quite simple configuration, and the humidifying device having higher performance than the conventional ones can be configured.

The invention claimed is:

1. A separator for use in a humidifying device comprising: an elastic layer including a convex-concave portion formed on each of main surfaces of said elastic layer,
wherein convex portions of the convex-concave portion contact a steam permeable membrane, and
a fluid channel is formed by concave portions of the convex-concave portion.

2. The separator according to claim 1, wherein a thickness of the elastic layer is not less than 1.66 times as large as a thickness of the steam permeable membrane.

3. The separator according to claim 1, further comprising a stiff layer.

4. The separator according to claim 3, wherein:
wall portions formed by the elastic layer are formed to project from a surface of the stiff layer;
the wall portions constitute the convex portions of the convex-concave portion; and
spaces between the wall portions constitute the concave portions of the convex-concave portion.

5. The separator according to claim 1, wherein the convex portions are entirely constituted by the elastic layer.

6. The separator according to claim 3, wherein the elastic layer comprises:
a first elastic layer; and
a second elastic layer, wherein:
the first elastic layer and the second elastic layer are connected to each other by through holes formed on the stiff layer.

7. The separator according to claim 1, being entirely formed by the elastic layer.

8. The separator according to claim 1, wherein the elastic layer is formed to contain EPDM or fluorocarbon rubber not containing sulfur.

9. The separator according to claim 1, wherein the elastic layer has hardness of 30 to 100 of A Scale of Durometer Hardness defined in JIS K6200.

10. A humidifying device comprising: separators according to any one of claims 1 to 7; and
steam permeable membranes, wherein:
the separators and the steam permeable membranes are stacked on and fastened to one another such that a steam permeable membrane is sandwiched between the main surfaces of the elastic layer; and
a primary fluid flows through a first channel formed on one of the main surfaces of each of the elastic layers which surface contacts the steam permeable membrane, and a secondary fluid flows through a second channel formed on the other main surface of each of the elastic layers which surface contacts the steam permeable membrane, causing moisture contained in the primary fluid to permeate the steam permeable membrane to humidify the secondary fluid.

11. A fuel cell system comprising: a fuel cell configured to generate electric power by using a fuel gas and an oxidizing gas; and
the humidifying device according to claim 10, which is disposed on a supply channel of at least one of the fuel gas and the oxidizing gas.

12. The separator according to claim 1, wherein the elastic layer includes an organic polymer.

13. The separator according to claim 1, wherein the elastic layer includes at least one of an elastomer and plastic foam.

* * * * *